US012705364B2

(12) United States Patent
Drew et al.

(10) Patent No.: US 12,705,364 B2
(45) Date of Patent: Aug. 11, 2026

(54) CPE PREDICTION USING BANNER SIMILARITY

(71) Applicant: CrowdStrike, Inc., Sunnyvale, CA (US)

(72) Inventors: Shaefer Drew, Lynnwood, WA (US); Moshe Shimon Perez, Netanya (IL); Michael Avraham Brautbar, Wayland, MA (US); Yotam Lichter, Eftat (IL)

(73) Assignee: CrowdStrike, Inc., Sunnyvale, CA (US)

( * ) Notice: Subject to any disclaimer, the term of this patent is extended or adjusted under 35 U.S.C. 154(b) by 139 days.

(21) Appl. No.: 18/895,780

(22) Filed: Sep. 25, 2024

(65) Prior Publication Data

US 2026/0087144 A1 Mar. 26, 2026

(51) Int. Cl.
*G06F 21/57* (2013.01)
*H04L 9/40* (2022.01)

(52) U.S. Cl.
CPC ...... *G06F 21/577* (2013.01); *G06F 2221/033* (2013.01); *G06F 2221/034* (2013.01)

(58) Field of Classification Search
CPC ............... G06F 21/577; G06F 2221/33; G06F 2221/034; H04L 63/1433
See application file for complete search history.

(56) References Cited

U.S. PATENT DOCUMENTS 9,569,201 B1 2/2017 Lotem
10,334,065 B2 6/2019 Llanos Alonso et al.
10,339,319 B2 * 7/2019 Kim .................. G06F 16/90344
10,762,214 B1 * 9/2020 Martin .................. G06F 16/245
11,057,289 B2 7/2021 Ranjan et al.
11,122,040 B1 9/2021 Sun et al.
11,178,223 B2 11/2021 Morin
11,507,860 B1 11/2022 Hodgman
11,895,372 B1 2/2024 Sanghavi
12,028,368 B1 7/2024 Cohen
12,126,643 B1 10/2024 Skarphedinsson
(Continued)

FOREIGN PATENT DOCUMENTS

CN 110213212 9/2019
CN 110233821 A * 9/2019 ......... H04L 63/1433
(Continued)

OTHER PUBLICATIONS

Bennouk et al. "A Comprehensive Review and Assessment of Cybersecurity Vulnerability Detection Methodologies." Journal of Cybersecurity and Privacy. Oct. 6, 2024. (Year: 2024).*
(Continued)

*Primary Examiner* — Sarah Su
(74) *Attorney, Agent, or Firm* — Law Office of Scott P. Zimmerman, PLLC

(57) ABSTRACT

Prediction of matches between CPEs and banners greatly improves computer functioning. Many web services have an unknown common platform enumeration (CPE). When the CPE is unknown, a computer system is unable to obtain cybersecurity flaws and software fixes for a software product or web service. A similarity between the CPE and a service banner, though, accurately predicts a match the CPE and the web service. CPEs, for example, may thus be identified for old, obsolete, and uncomment software products and services.

20 Claims, 36 Drawing Sheets

(56) References Cited

U.S. PATENT DOCUMENTS

| | | | | |
|---|---|---|---|---|
| 12,549,590 | B1 * | 2/2026 | Drew | H04L 63/1433 |
| 2018/0129810 | A1 | 5/2018 | Kim | |
| 2019/0007394 | A1 | 1/2019 | Patel et al. | |
| 2022/0141247 | A1 | 5/2022 | Shakarian et al. | |
| 2022/0215100 | A1 | 7/2022 | Waplington | |
| 2023/0034866 | A1 | 2/2023 | Hodgman | |
| 2023/0171292 | A1 * | 6/2023 | Crabtree | H04L 63/1433 726/22 |
| 2023/0205892 | A1 | 6/2023 | Wareus | |
| 2024/0028740 | A1 * | 1/2024 | Chan | G06F 21/577 |
| 2024/0427879 | A1 | 12/2024 | Bulut | |
| 2025/0039244 | A1 * | 1/2025 | Grzonkowski | H04L 63/205 |
| 2025/0080579 | A1 | 3/2025 | Mushtaq | |
| 2025/0124475 | A1 | 4/2025 | Carlson | |
| 2025/0141912 | A1 * | 5/2025 | Hill | H04L 63/1433 |
| 2025/0158959 | A1 | 5/2025 | Kang | |
| 2025/0265418 | A1 | 8/2025 | Kasuya | |
| 2026/0023549 | A1 * | 1/2026 | White | G06F 8/65 |

FOREIGN PATENT DOCUMENTS

| | | | | | |
|---|---|---|---|---|---|
| CN | 110708292 | | | 1/2020 | |
| CN | 118364476 | B | | 8/2024 | |
| CN | 119011300 | A | | 11/2024 | |
| CN | 119277378 | A | * | 1/2025 | H04L 9/0877 |
| CN | 119760712 | A | | 4/2025 | |
| KR | 102079687 | | | 2/2020 | |
| KR | 20200056627 | A | | 5/2020 | |
| KR | 20210091953 | | | 7/2021 | |
| KR | 20230077073 | | | 6/2023 | |
| KR | 20240178195 | | | 12/2024 | |
| WO | WO-2008101289 | | | 8/2008 | |
| WO | WO-2021160822 | | | 8/2021 | |
| WO | WO-2022023671 | A1 | * | 2/2022 | G06F 21/577 |
| WO | WO-2022172437 | A1 | * | 8/2022 | G06N 20/00 |
| WO | WO-2025115162 | A1 | | 6/2025 | |

OTHER PUBLICATIONS

Pothamsetty, Venka, "How to Generate CPE information from Software Using Generative AI," https://transilience.freshdesk.com/support/solutions/articles/154000142201, accessed on or about Nov. 25, 2024.

Wareus, Emil, and Hell, Martin, "Automated CPE Labeling of CVE Summaries with Machine Learning," Springer Nature Switzerland AG 2020, 20 pages.

Https://www.aimodels.fyi/papers/arxiv/distalaner-distantly-supervised-active-learning-augmented-named, accessed on or about Nov. 25, 2024.

Banerjee, Somnath et al., "DISTALANER: Distantly Supervised Active Learning Augmented Named Entity Recognition in the Open Source Software Ecosystem," 21 pages.

Hu et al., "CPE-Identifier: Automated CPE identification and CVE summaries annotation with Deep Learning and NLP," experarXiv:2405.13568v1 [cs.CR] May 22, 2024, 12 pages.

Sadlek et al., "Current Challenges of Cyber Threat and Vulnerability Identification Using Public Enumerations," ARES 2022, Jun. 29, 2022, Vienna, Austria, 8 pages.

Kim et al., "A Design of Automated Vulnerability Information Management System for Secure Use of Internet-Connected Devices Based on Internet-Wide Scanning Methods," IEICE Trans. Inf. & Syst., vol. E 104-D, No. 11 Nov. 2021, 9 pages.

Final Office Action for U.S. Appl. No. 19/049,283, Drew "CPE Prediction Using Banner-Prompted LLM", mailed Sep. 5, 2025, 28 pages.

Notice of Allowance for U.S. Appl. No. 19/080,998, Drew "CPE Prediction Using Banner-Prompted AI/ML Modeling", mailed Sep. 16, 2025, 9 pages.

Delgado et al., "A Comprehensive Survey on Generative AI Solutions in IoT Security," Electronics 2024, 13, 4965. https://doi.org/10.3390/electronics13244965, 36 pages.

Zander et al., "Automated Traffic Classification and Application Identification using Machine Learning," Proceedings of the IEEE Conference on Local Computer Networks 30th Anniversary (LCN'05), Dec. 2005, 8 pages.

Notice of Allowance for U.S. Appl. No. 19/049,283, Drew "CPE Prediction Using Banner-Prompted LLM", mailed Jan. 14, 2026, 17 pages.

Huff, Philip et al., "A Recommender System for Tracking Vulnerabilities," The 16th International Conference on Availability, Reliability and Security (ARES 2021), Aug. 17-20, 2021, Vienna, Austria. ACM, New York, NY, USA, 7 pages. https://doi.org/10.1145/3465481.3470039.

Janovsky, Adam et al., "sec-certs: Examining the security certification practice for better vulnerability mitigation," Masaryk University, Brno, Czechia, arXiv:2311.17603v2 [cs.CR] Jul. 1, 2024, 27 pages.

Mcclanahan, Kylie et al., "Towards Automatically Matching Security Advisories to CPEs: String Similarity-based Vendor Matching," 2024 Workshop on Computing, Networking and Communications (CNC), 6 pages.

Wåreus, Emil and Hell, Martin, "Automated CPE Labeling of CVE Summaries with Machine Learning," Debricked AB, Malmö, Sweden, Department of Electrical and Information Technology, Lund University, Lund, Sweden, 20 pages, 2020.

Baek, J. English Translation of KR 20210091953 A. (Year 2021).

* cited by examiner

FIG. 12

Software Services Table

38 & 130

| Field | Type | Description | Example |
| --- | --- | --- | --- |
| ip_address | str | IP Address | 104.77.227.179 |
| port | bigint | port number | 443 |
| transport | str | transport protocol | tcp |
| timestamp | timestamp | timestamp of service | 2024-07-02T15:32:58.779918 |
| banners | str | HTML response of http/s request | <HTML><HEAD>\n<TITLE>Invalid URL</TITLE>\n</HE... |
| attributes | str | Attribute metadata response from banner grabbing | {"cookies": [], "favicon_fingerprint": null, "server": "nginx", ... |
| protocol | str | protocol of service | http |
| cpes | list of strings | Yara-predicted CPEs | ["cpe:/a:php:php:5.3.3", "cpe:/a:apache:http_server"] |

| Feature Name | Data Type | Description | Example |
|---|---|---|---|
| text | str | 1. Concate banners and attributes together into 1 text blob<br>2. Convert attribute json string to dictionary and oversample...<br>a. Server attribute<br>b. SSL Certificate commonName<br>c. SSL certificate organizationName<br>d. X-Powered-By<br>3. Add oversampled text from step 2 into "text" feature | '<!DOCTYPE html PUBLIC "-//W3C//DTD HTML 4.01//EN" "http://www.w3.org/TR/html4/strict.dtd"<br>>\n<html>\n\t<head>\n\t\t<meta http-equiv="Content-Type"<br>content="text/html; charset=utf-8">\n\t\t<title>ERROR: The requested URL could not be<br>retrieved</title>\n\t</head>\n\t<body>\n\t\t<h1>ERROR:<br>The requested URL could not be retrieved</h1>\n\t\t<h4>Error code: 22</h4>\n\t\t<h4>Date:<br>Tue, 02 Jul 2024 13:56:19 GMT</h4>\n\t\t<h4>Request:<br>/</h4>\n\t</body>\n</html>\n ***** {"cookies": {}, "favicon_fingerprint": null, "meta":<br>{"<meta http-equiv="content-type"<br>content="text/html; charset=utf-8" />"}, "response_headers": {"Cache-<br>Status": "us2237.tmobatt.com", "Connection": "close",<br>"Content-Length": "429", "Content-Type": "text/html;charset=utf-8", "Date": "Tue, 02 Jul<br>2024 13:56:19 GMT", "Mime-Version": "1.0",<br>"Server": "squid", "Via": "1.1 us2237.tmobatt.com (squid)", "X-Squid-Error":<br>"ERR_INVALID_URL 0"}, "technologies": {}, "title": null}<br>*****squid squid squid squid squid squid squid squid squid squid squid squid ' |

| banners | attributes |
| --- | --- |
| <!DOCTYPE html PUBLIC "-//W3C//DTD XHTML 1.0 S... | {"cookies": [], "favicon_fingerprint": null, "... |

```
vectorizer = TfidfVectorizer(vocabulary = keywords_list, stop_words = 'english', smooth_idf = True,  min_df =
0.0)
```

| Field | Type | Description | Example |
|---|---|---|---|
| cpeName | str | CPE Name | cpe:2.3:a:apache:http_server:1.0.2:*:*:* |
| vendor | str | vendor name | apache |
| product | str | product name | http_server |
| vendor:product | str | vendor:product combination | apache:http_server |
| vendor_count | int | count of unique vendors for that product name | 1 |
| vendors_text | str | space-separated word tokens from vendor name | apache |
| products_text | str | space-separated word tokens from product name | http server |
| tokens_text | str | space-separated word tokens from vendor and product name, with the product name oversampled 4 times | apache http server http server http server http server |

```
df_cpes = df_cpes[~(df_cpes['tokens_text'].apply(lambda x: True if len([i for i in x.split() if i in
stop_words]) / len(x.split()) >= 0.33 else False))]
```

```
excluded_cpes_letter = set(df_cpes_copy[(df_cpes_copy['products_text'].apply(lambda x: True if (len([i
for i in x.split() if len(i) == 1]) / len(x.split()) >= .5) &
                                                                              (len([i for i in x.split()
if len(i) > 6]) < 1) else False))]['vendor_product'])
df_cpes = df_cpes[~df_cpes['vendor_product'].isin(excluded_cpes_letter)]
```

| Feature Name | Data Type | Description | Example |
|---|---|---|---|
| vendor_count | int | count of unique vendors for that product name, calculated by a simple groupby with product name | 1 |
| vendors_text | str | space-separated word tokens from vendor name | apache |
| products_text | str | space-separated word tokens from product name | http server |
| tokens_text | str | space-separated word tokens from vendor and product name, with the product name oversampled 4 times | apache http server http server http server http server |

FIG. 23

```
def extract_products(s):
    return [x.lower() for x in re.split('[\s_-]', s) if len(x) > WORD_LENGTH]
def extract_vendors(s):
    return [x.lower() for x in re.split('[\s_-]', s) if len(x) > WORD_LENGTH]
```

| vendor_product | tokens_text |
|---|---|
| xwiki:commons | xwiki commons |

```
cpe_vectorizer = CountVectorizer(vocabulary = keywords_list, stop_words = 'english', token_pattern = r'[^ ]+',
min_df = 0.0)
```

<table>
<tr><th></th><th></th><th>Services</th><th>CPEs</th></tr>
<tr><td>24 & 38</td><td>Text</td><td>Server: Nginx</td><td>F5 Nginx</td></tr>
<tr><td>120 & 122</td><td>Vector Representations</td><td>F5 | Server | Nginx<br>[0, 0.11, 0.87]</td><td>F5 | Server | Nginx<br>[1, 0, 1]</td></tr>
<tr><td>82</td><td>Score</td><td>0*1 + 0.11*0 + 0.87*1 / (1 + 0 + 1) = 0.435</td><td></td></tr>
</table>

Figure 31:
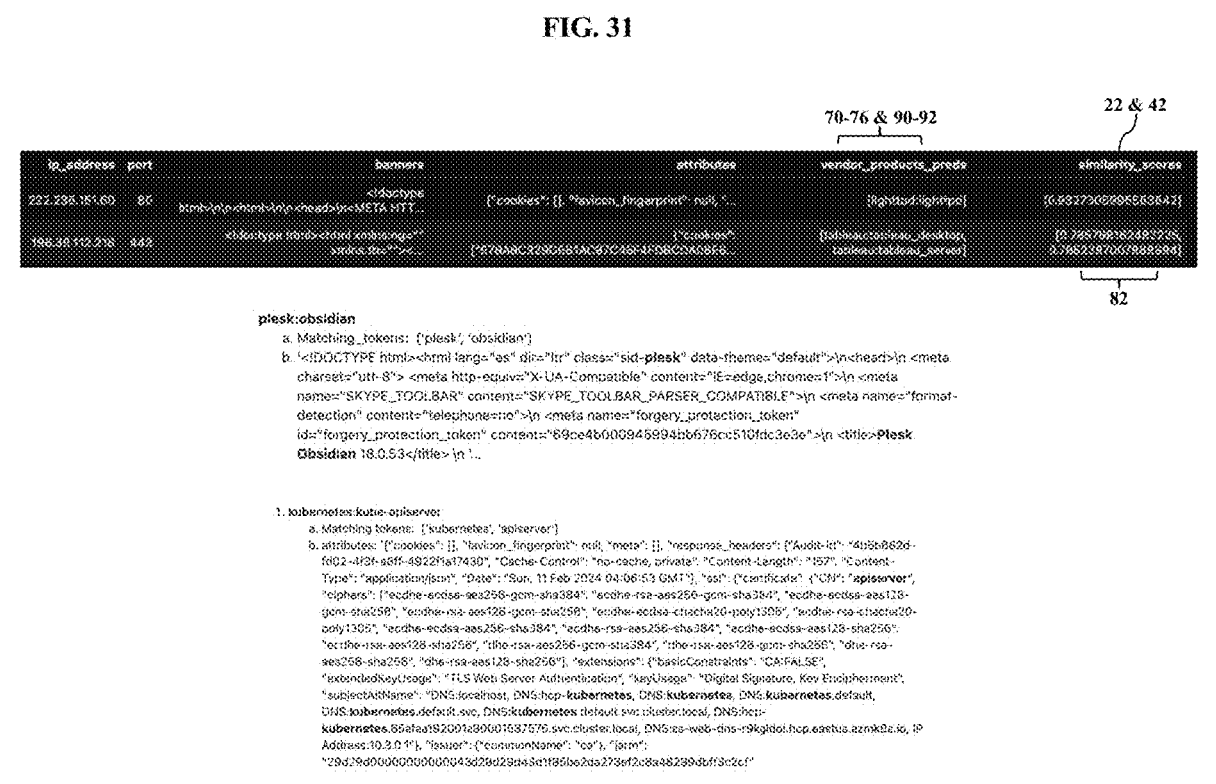

| ip_address | port | banners | attributes | vendor_products_preds | similarity_scores |
|---|---|---|---|---|---|
| 222.236.151.60 | 80 | <!doctype html>\n<html>\n\n<head>\n<META HTT... | {"cookies": [], "favicon_fingerprint": null, "... | [lighttpd:lighttpd] | [0.9327[illegible]] |
| 198.38.112.238 | 443 | <!doctype html><html xml:lang="" xmlns:fb=""><... | {"cookies": {"678A8C329C6B1AC67C45F4FDBC0A56F6... | [tableau:tableau_desktop, tableau:tableau_server] | [0.7857[illegible], 0.7662[illegible]] |

82 plesk:obsidian a. Matching_tokens: {'plesk', 'obsidian'} b. '<!DOCTYPE html><html lang="es" dir="ltr" class="sid-plesk" data-theme="default">\n<head>\n <meta charset="utf-8"> <meta http-equiv="X-UA-Compatible" content="IE=edge,chrome=1">\n <meta name="SKYPE_TOOLBAR" content="SKYPE_TOOLBAR_PARSER_COMPATIBLE">\n <meta name="format-detection" content="telephone=no">\n <meta name="forgery_protection_token" id="forgery_protection_token" content="69ce4b000945994bb676cc510fdc3e3e">\n <title>Plesk Obsidian 18.0.53</title> \n '...

1. kubernetes:kube-apiserver a. Matching tokens: {'kubernetes', 'apiserver'} b. attributes: '{"cookies": [], "favicon_fingerprint": null, "meta": [], "response_headers": {"Audit-Id": "4b5b862d-fd02-4f3f-a6ff-4922f1a17430", "Cache-Control": "no-cache, private", "Content-Length": "157", "Content-Type": "application/json", "Date": "Sun, 11 Feb 2024 04:06:53 GMT"}, "ssl": {"certificate": {"CN": "apiserver", "ciphers": ["ecdhe-ecdsa-aes256-gcm-sha384", "ecdhe-rsa-aes256-gcm-sha384", "ecdhe-ecdsa-aes128-gcm-sha256", "ecdhe-rsa-aes128-gcm-sha256", "ecdhe-ecdsa-chacha20-poly1305", "ecdhe-rsa-chacha20-poly1305", "ecdhe-ecdsa-aes256-sha384", "ecdhe-rsa-aes256-sha384", "ecdhe-ecdsa-aes128-sha256", "ecdhe-rsa-aes128-sha256", "dhe-rsa-aes256-gcm-sha384", "dhe-rsa-aes128-gcm-sha256", "dhe-rsa-aes256-sha256", "dhe-rsa-aes128-sha256"], "extensions": {"basicConstraints": "CA:FALSE", "extendedKeyUsage": "TLS Web Server Authentication", "keyUsage": "Digital Signature, Key Encipherment", "subjectAltName": "DNS:localhost, DNS:hcp-kubernetes, DNS:kubernetes, DNS:kubernetes.default, DNS:kubernetes.default.svc, DNS:kubernetes.default.svc.cluster.local, DNS:hcp-kubernetes.65afaa192001a80001537576.svc.cluster.local, DNS:ss-web-dns-r9kgldol.hcp.eastus.azmk8s.io, IP Address:10.0.0.1"}, "issuer": {"commonName": "ca"}, "jarm": "29d29d00000000000043d29d29d43d1f85be2da273ef2c8a48299dbff3c2cf"

CPE PREDICTION USING BANNER SIMILARITY

BACKGROUND

The subject matter described herein generally relates to electrical communications and to computer security and, more particularly, the subject matter relates to computer vulnerability analysis.

Many computers are exposed to cybersecurity threats. It seems every day there is another cybersecurity hack that steals account passwords, business data, and personal information. Large computer networks, in particular, are especially vulnerable to cybersecurity threats. Large computer networks may have hundreds or even thousands of computers, so it's increasingly difficult to monitor such large numbers of computers. Many of these computers may run outdated software, so these computers are especially vulnerable to cybersecurity threats.

SUMMARY

Accurate prediction of common platform enumeration (CPE) helps resolve cybersecurity vulnerabilities. Many software products and web services have an unknown CPE. The CPE identifies known cybersecurity vulnerabilities and software fixes. When the CPE is unknown, however, the cybersecurity vulnerabilities remain unresolved and computer functioning is jeopardized. A CPE prediction service, though, identifies which CPEs should be matched to their corresponding software products and web services. The CPE prediction service grabs service banners and generates a prediction. The prediction identifies which one or more CPEs match or belong to a software product or web service, based on the service banners. The CPE prediction service thus elegantly and quickly matches a CPE to its corresponding software product or web service. Once the CPE is known, the cybersecurity vulnerabilities may be fixed and computer functioning is improved.

BRIEF DESCRIPTION OF THE SEVERAL VIEWS OF THE DRAWINGS

The features, aspects, and advantages of common platform enumeration (or CPE) prediction are understood when the following Detailed Description is read with reference to the accompanying drawings, wherein:

FIGS. 12-20 illustrate examples of data transformations and feature engineering;

FIG. 21 illustrates examples of CPE updates FIGS. 22-25 illustrate more examples of machine learning;

FIGS. 26-30 illustrate more examples of a similarity analysis;

FIG. 31 illustrates examples of a CPE-to-banner match and a CPE-to-banner match prediction;

DETAILED DESCRIPTION

Old and outdated software is especially vulnerable to cybersecurity threats. As we all know, nearly every day there is another cybersecurity hack that steals account passwords, business data, and personal information. Many of these cybersecurity hacks can be traced back to old and outdated software. People and companies simply fail to update their computer software with the latest fixes. Indeed, some companies are still using years or even decades old software that is easily exploited by hackers.

Some examples relate to predicting when computers need software updates. A common platform enumeration (or CPE) prediction service simply, quickly, and elegantly predicts when a computer needs a software update. The CPE prediction service, in particular, identifies computers that are unknowingly connected to the public Internet. These unknown, Internet-facing computers are blind spots to users and to IT administrators, and these unknown, Internet-facing computers can be riddled with vulnerable software. The CPE prediction service, however, identifies a computer that connects to the public Internet. The CPE prediction service then also predicts one or more software vendors, products, and versions that are installed to the computer. Once the CPE prediction service predicts what software is installed to the computer, the CPE prediction service may then quickly and easily determine whether the software is out of date. The CPE prediction service, for example, may use the predicted software vendor/product/version to lookup the known vulnerabilities, patches, and other updates. The CPE prediction service may thus alert consumers and companies that they have an Internet-exposed computer running outdated software that is vulnerable to cybersecurity attacks.

The CPE prediction service will now be described more fully hereinafter with reference to the accompanying drawings. The CPE prediction service, however, may be embodied in many different forms and should not be construed as limited to the examples set forth herein. These examples are provided so that this disclosure will be thorough and complete and fully convey the CPE prediction service to those of ordinary skill in the art. Moreover, all the examples of the CPE prediction service are intended to encompass both structural and functional equivalents thereof. Additionally, it is intended that such equivalents include both currently known equivalents as well as equivalents developed in the future (i.e., any elements developed that perform the same function, regardless of structure).

Figure 1:
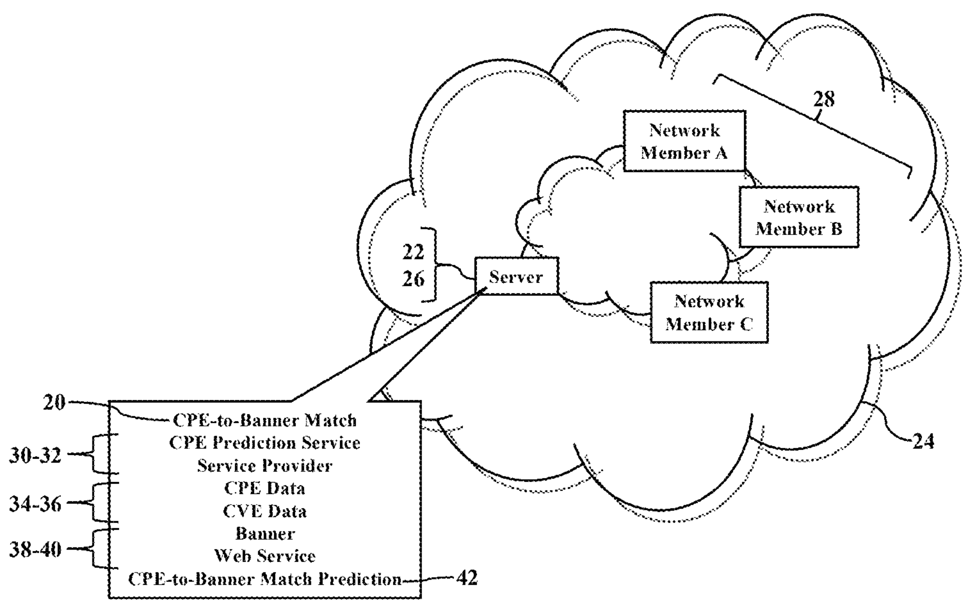
FIGS. 1-3 illustrate some examples of predicting CPE-to-banner matches.
Figure 2:
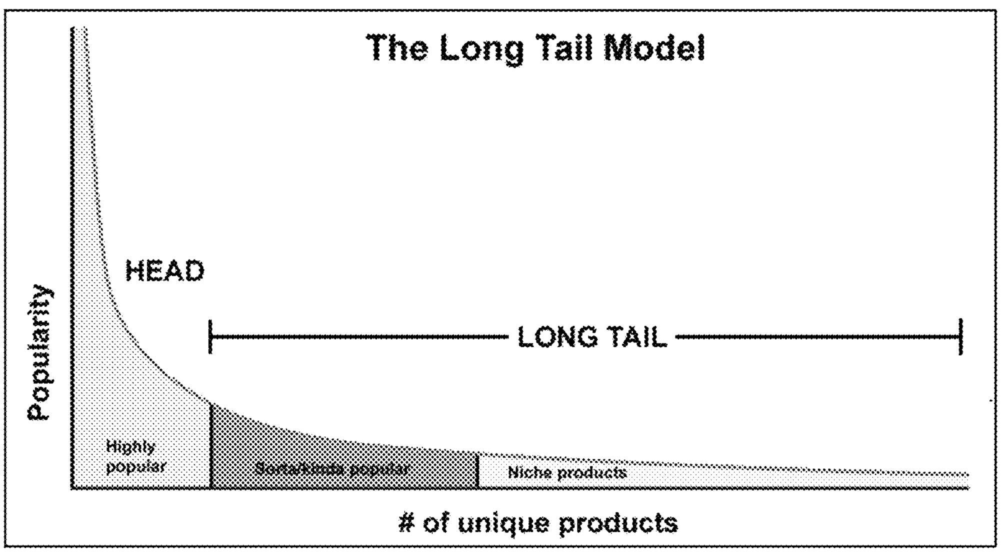
Figure 3:
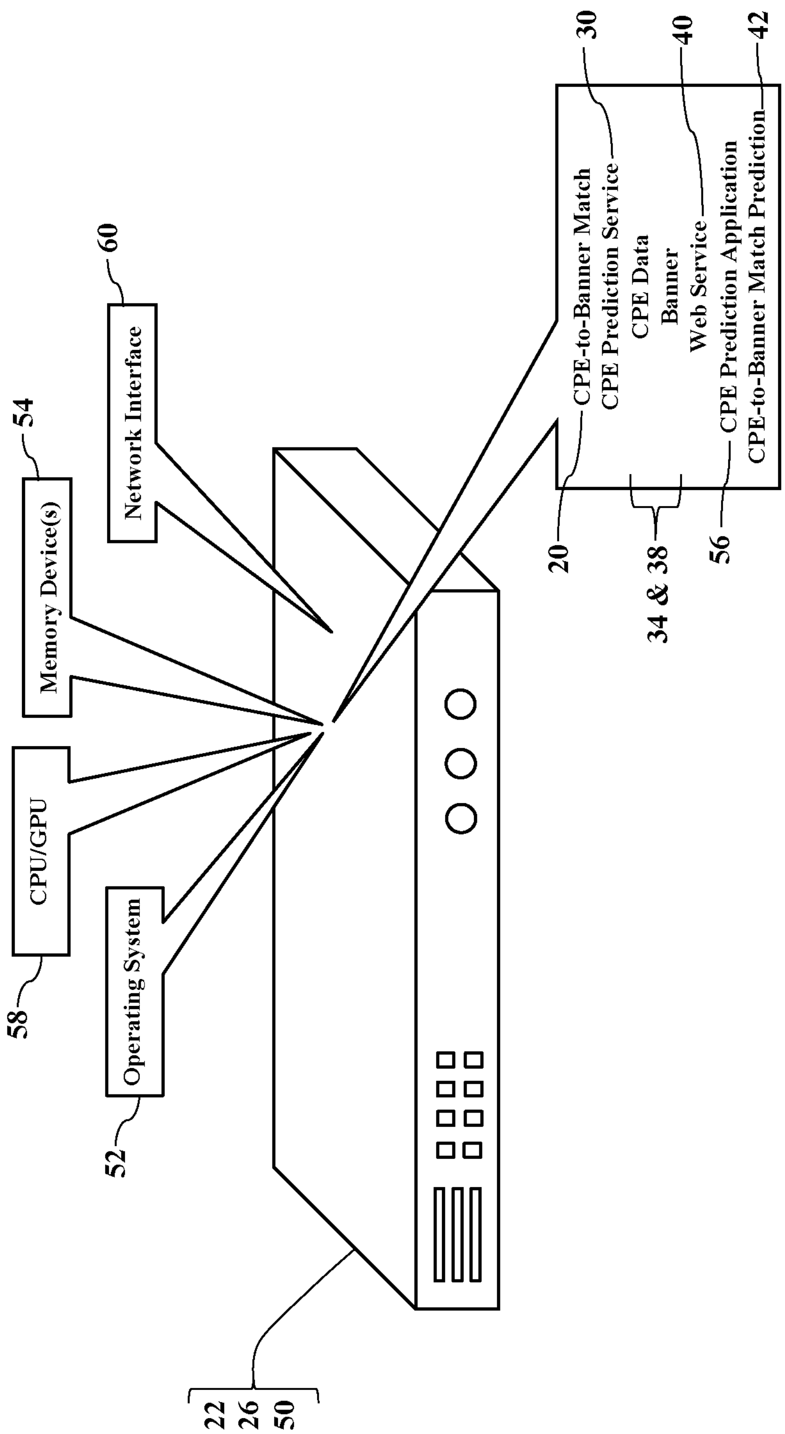

FIGS. 1-3 illustrate some examples of predicting CPE-to-banner matches 20. A computer system 22 operates in a cloud computing environment 24. FIG. 1 illustrates the computer system 22 as a server 26. The computer system 22, though, may be any processor-controlled device, as later paragraphs will explain. In this example, the server 26 communicates via the cloud computing environment 24 (e.g., public Internet, private network, and/or hybrid network) with other servers, devices, computers, or other networked members 28 operating within, or affiliated with, the cloud computing environment 24. The cloud computing environment 24 provides a common platform enumeration (or CPE) prediction service 30 on behalf of a service provider 32. The CPE prediction service 30 retrieves or acquires common platform enumeration (or CPE) data 34. The CPE prediction service 30 may also retrieve or acquire common vulnerabilities and exposures (or CVE) data 36. The CVE data 36 describes known cybersecurity vulnerabilities and exposures for the corresponding CPE data 34. The CPE prediction service 30 also retrieves or acquires one or more service banners 38 that are associated with a software-based web service 40. The cloud computing environment 24 inspects and analyzes the CPE data 34 and the service banner(s) 38 to generate a CPE-to-banner match prediction 42. The CPE-to-banner match prediction 42, in plain words, predicts which one or more CPEs match, belong to, or provide the web service 40.

As FIG. 2 illustrates, accurate identification of CPEs and CVEs has long been a problem. Computers have been around for decades, and computer software services have exponentially grown. It's estimated, for example, that, over the decades, there have been nearly 43,000 known software applications (e.g., vendor:product CPEs) in the field, representing a long-tail distribution of niche products that are prominent across organizations. Today, however, conventional rules-based schemes only cover about 318 of these CPEs. Because each rule requires hours of work to write and validate, it's simply not humanly practical, nor economically feasible, to implement rules that define all the 43,000 known computer software services 40 (such as different software products/versions offered by many different vendors). Indeed, it's estimated that nearly 40% of HTTP/HTTPS services have zero/no CPE coverage from existing rules. Many computer software services 40, for example, are old, legacy, or unpopular versions that are still in use. Because many computer software services 40 lack their corresponding CPE data 34, these computer software services 40 are especially vulnerable to cyberattacks. Because the CPE data 34 is unknown, it's very difficult for IT administrators to determine the CVE data 36. So, simply put, if the CPE data 34 is unknown, IT and cybersecurity professionals can't search the CVE data 36 for the corresponding web service 40. Without the CPE data 34, IT and cybersecurity professionals are blind to the cybersecurity risks associated with the web service 40.

Returning to FIG. 1, the CPE prediction service 30, though, predicts which CPE data 34 corresponds to the CVE data 36 and web service 40. When the cloud computing environment 24 receives the CPE data 34 and the service banner 38 associated with the web service 40, the nodal networked members 28 inspect and analyze the CPE data 34 and the banner 38. While there may be many networked members 28 of the cloud computing environment 24, FIG. 1 illustrates a simple example using the server 26. That is, when the cloud computing environment 24 receives the CPE data 34 and the banner 38, the nodal networked members 28 may forward the CPE data 34 and the banner 38 to the server 26. The server 26 is programmed to predict the CPE data 34 that corresponds to the web service 40, based on the service banner 38. The server 26 generates the CPE-to-banner match prediction 42 that identifies which CPE data 34 corresponds to the web service 40.

As FIG. 3 illustrates, the server 26 is programmed to predictively match the CPE data 34 to the web service 40. FIG. 3 illustrates the server 26 as a rack server 50, which is commonly installed in server rooms and in server farms. The server 26/50 is programmed to provide the common platform enumeration (or CPE) prediction service 30. The server 26/50 predicts the CPE data 34 that corresponds to the web service 40, based on the service banner 38. The server 26/50 stores and executes an operating system 52 in a memory device 54. The server 26/50 also stores a cybersecurity CPE prediction application 56 in the memory device 54. The server 26/50 has a hardware processor with cores 58 (illustrated as "CPU/GPU") that reads and executes the operating system 52 and the cybersecurity CPE prediction application 56. The server 26/50 also has network interfaces 60 to multiple communications networks (such as the cloud computing environment 24 illustrated in FIG. 1), thus allowing bi-directional communications with other networked devices and services. The cybersecurity CPE prediction application 56 has programming code or instructions that cause the server 26 to perform operations, such as determining the CPE-to-banner match 20 by generating the CPE-to-banner match prediction 42. The cybersecurity CPE prediction application 56 thus programs the server 26/50 to predict whether the CPE data 34 corresponds to the web service 40, using banner data representing the banner 38.

Figure 4:
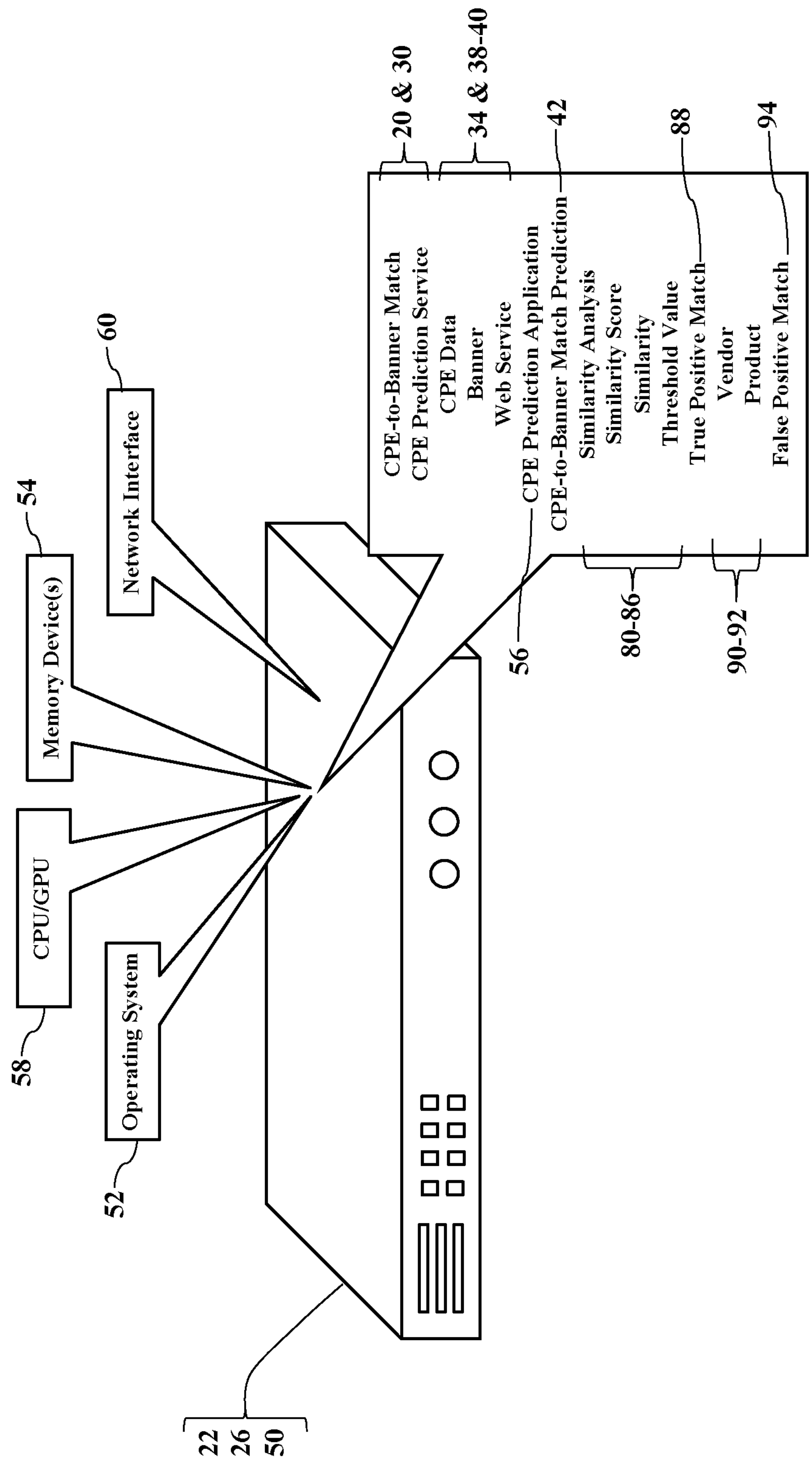
FIGS. 4-7 illustrate some examples of a common platform enumeration (or CPE) prediction service.
Figure 5:
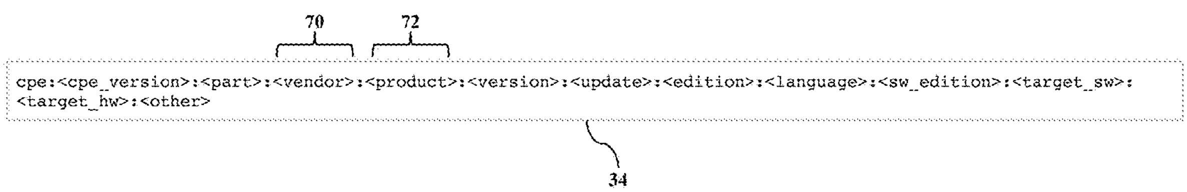
Figure 6:
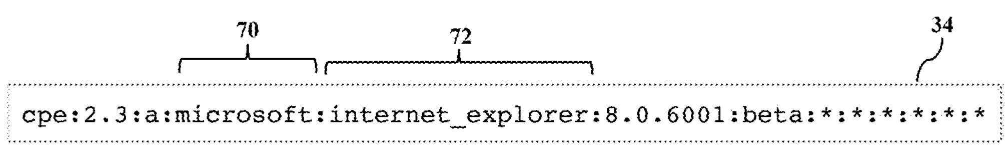
Figure 7:
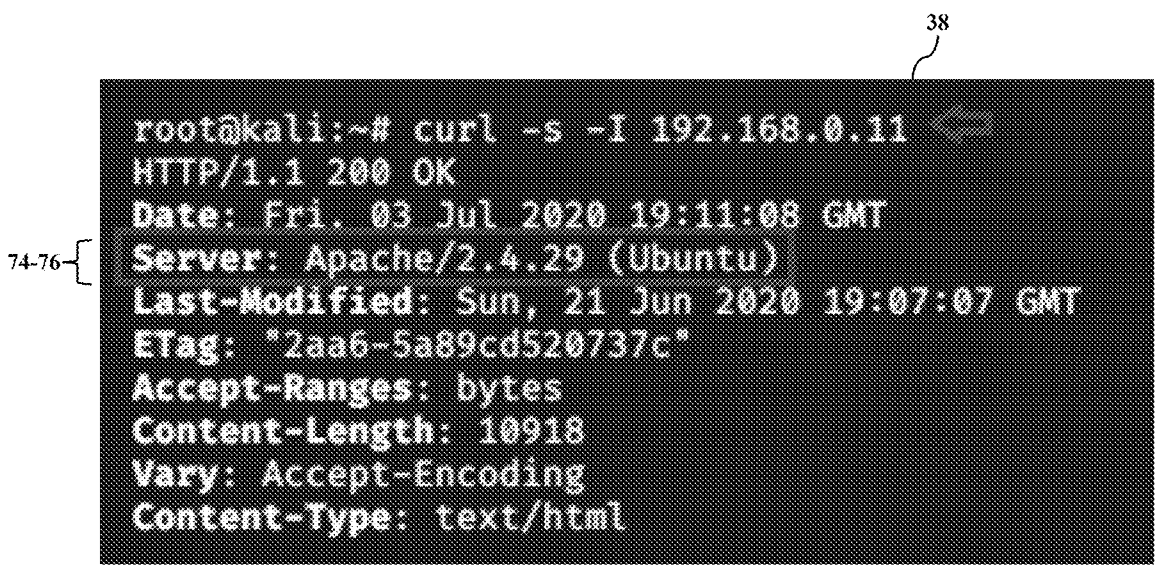

FIGS. 4-7 illustrate some examples of the common platform enumeration (or CPE) prediction service 30. FIG. 4 illustrates the computer system 22 (again illustrated as the rack server 50) providing the CPE prediction service 30. The CPE prediction application 56 may cause or instruct the server 26/50 to retrieve the CPE data 34. FIGS. 5-6 illustrate examples of the data fields representing the CPE data 34, FIG. 6 particularly illustrating the CPE data 34 identifying the MICROSOFT INTERNET EXPLORER® in a vendor data field 70 and in product data field 72. The CPE prediction application 56 may also cause or instruct the server 26/50 to retrieve the banner data representing the banner 38. FIG. 7 illustrates an example of the banner data fields representing the banner 38. The banner 38 may thus also identify or specify a vendor 74 and a product 76 (such as an APACHE® web server running the UBUNTU® operating system, version 2.4.29).

Returning to FIG. 4, a similarity analysis 80 may be used. The CPE prediction application 56 may instruct the server 26/50 to generate a similarity score 82 using the CPE data 34 and the banner data representing the service banner 38. The similarity score 82 represents a similarity 84 between the CPE data 34 and the banner 38 associated with the web service 40. The CPE prediction application 56 may then instruct the server 26/50 to generate the CPE-to-banner match prediction 42 based on the similarity score 82. The CPE prediction application 56, for example, may cause the server 26/50 to compare the similarity score 82 to a threshold value 86. If the similarity score 82 equals or exceeds the threshold value 86, then the CPE data 34 sufficiently matches or resembles the banner 38. The CPE prediction application 56 may thus predict that the CPE data 34 is a true positive match 88 with the web service 40. The CPE data 34 is sufficiently similar to the banner 38 that the CPE prediction application 56 may confidently determine that the CPE data 34 is associated with the web service 40. Because the CPE data 34 is associated with the web service 40, the CPE prediction application 56 may further determine the vendor 90 and the product 92 associated with the web service 40. The CPE prediction application 56, for example, may identify the vendor 90 and the product 92 by reading the vendor data fields 70/74 and product data fields 72/76 specified by the banner 38 and/or by the CPE data 34 (as illustrated by FIGS. 5-7). That is, by determining CPE data 34 is sufficiently similar to the banner 38, the CPE data 34 is also associated with the web service 40. The CPE prediction application 56 may use the banner 38 and/or the CPE data 34 to determine the vendor 90 and the product 92 that provides the web service 40.

The CPE prediction application 56, however, may decline correlation. If the similarity score 82 is less than the threshold value 86, then the CPE data 34 fails to sufficiently match or resemble the banner 38. The CPE data 34, in plain words, is unlike the banner 38. The CPE prediction application 56 may thus determine that the CPE data 34 is not associated with the web service 40. The CPE prediction application 56 may thus determine that the CPE data 34 is a false positive match 94 with the web service 40. The vendor and product data fields 74 and 76 described by the banner 38, in other words, do not provide the web service 40. The CPE data 34 and the banner 38 are unrelated.

The CPE prediction service 30 identifies novel CPE products and vendors. Conventional CPE schemes use custom rules (such as regular expressions) that are very difficult and time-consuming to define. Because the rules are so complex, conventional CPE schemes are too difficult and too expensive to implement for all CPEs. The conventional CPE schemes thus leave a large chunk of computer software services with unidentified CPEs. The CPE prediction service 30, though, elegantly uses data mining to discover new relationships between CPEs and computer software services 40. The CPE prediction service 30 identifies novel CPE products, as the vendor and product data field(s) 70-76 is/are perhaps an important data component of the CPE data 34 and a core identifier. The CPE prediction service 30 may also discover the vendor 90 and the product 92 by reading the vendor/product data field 70/72 (e.g., the vendor:product field combination of the CPE data 34).

Figure 8:
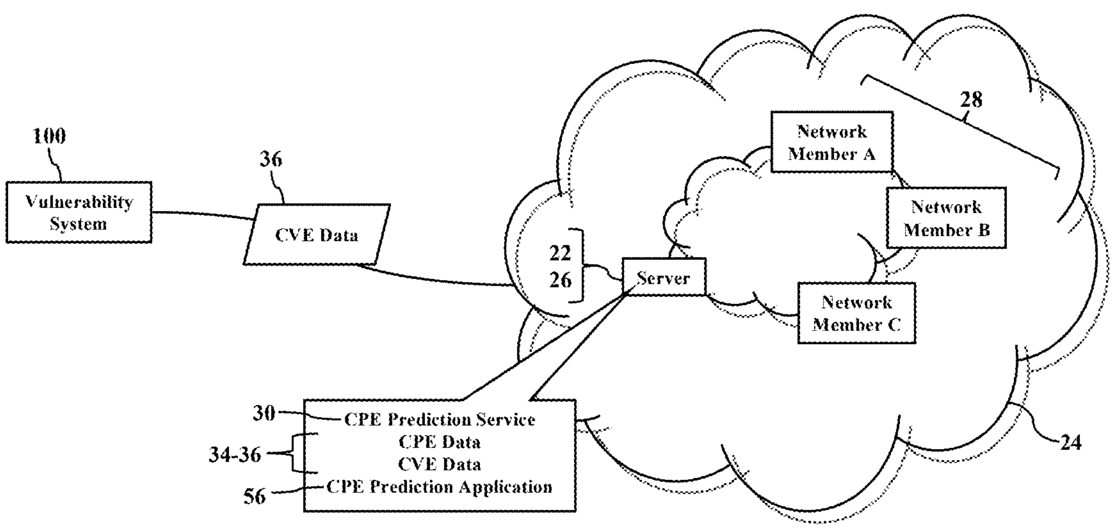
FIGS. 8-9 illustrate some examples of vulnerability identification.
Figure 9:
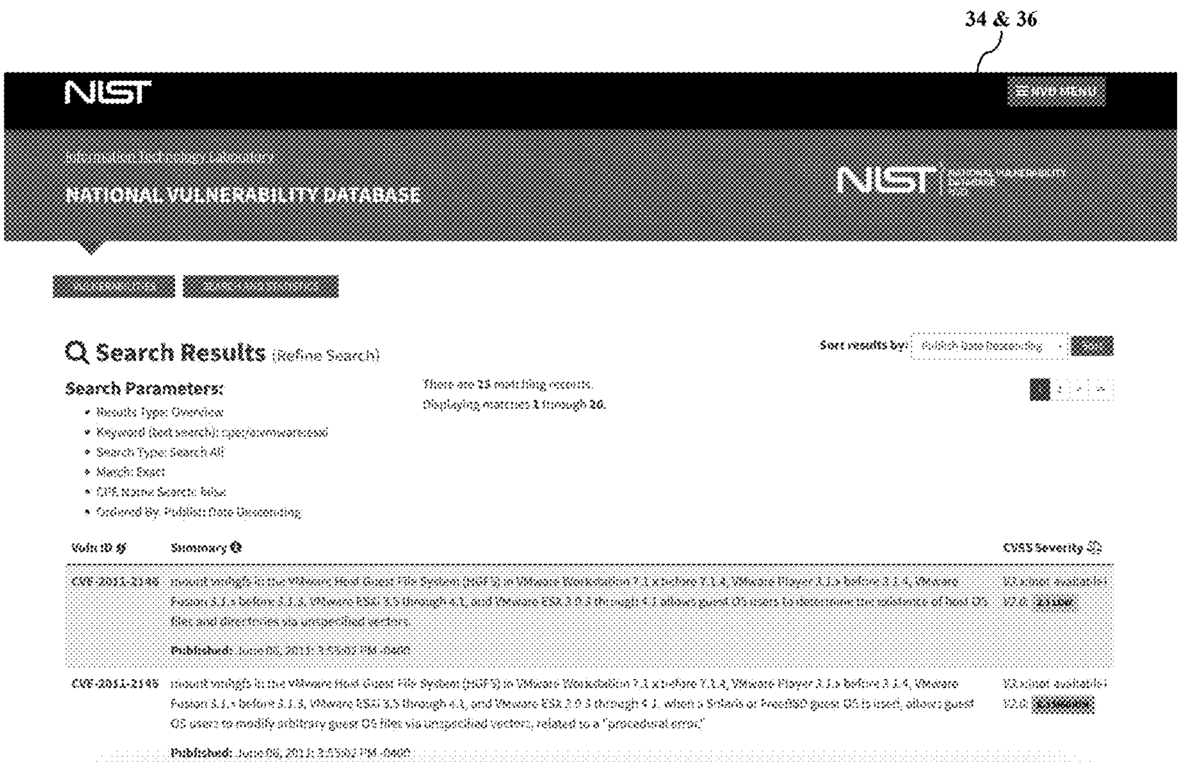

FIGS. 8-9 illustrate some examples of vulnerability identification. Once the common platform enumeration (or CPE) data 34 is matched to the web service 40, the CPE prediction service 30 may also retrieve the common vulnerabilities and exposures (or CVE) data 36 that corresponds to the CPE data 34. The CPE prediction application 56, for example, may instruct the server 26/50 to query a vulnerability system 100 for the CPE data 34. The CPE prediction service 30, as examples, may interface with the public National Vulnerability Database. The CPE prediction service 30, as more examples, may interface with private vulnerability systems (such as the VULNCHECK® system at www.vulncheck.com). Whatever vulnerability system 100 is used, the vulnerability system 100 sends a query response identifying the CVE data 36 that corresponds to the CPE data 34. As FIG. 9 illustrates, the CVE data 36 describes exploits, vulnerabilities, and other cybersecurity intelligence related to the CPE data 34. When the CPE prediction service 30 retrieves the CVE data 36, the CPE prediction application 56 may thus determine the cybersecurity vulnerabilities (and perhaps the solutions) that affect the vendor's product (such as, for example, vulnerabilities affecting Microsoft's INTERNET EXPLORER® illustrated in FIG. 6).

Figure 10:
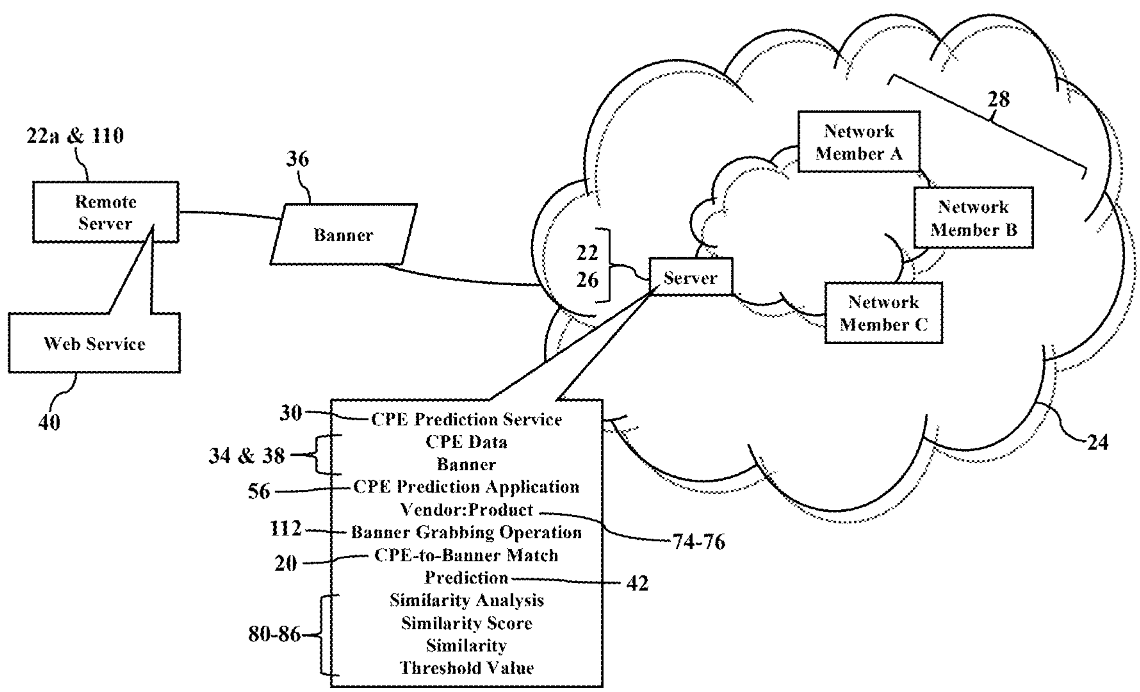
FIG. 10 illustrates some examples of banner grabbing.

FIG. 10 illustrates some examples of banner grabbing. The CPE prediction service 30 may retrieve the banner data representing the service banner 38. The banner 38 describes information about a remote/networked computer system **22*a* (illustrated as remote server 110) hosting the web service 40. The banner 38 provides many service and server/device details. The banner 38, for example, may identify a port, the computer software service(s) 40 (e.g., the vendor:product fields 74-76 illustrated in FIG. 7), and software version running on the remote/networked computer system 22 (again as illustrated in FIG. 7). The CPE prediction service 30 may use a banner grabbing operation 112 to acquire the banner 38. The CPE prediction service 30, for example, may use passive or active banner grabbing techniques that periodically or randomly send HTTP/HTTPS queries to some or all publicly-available IP addresses. The CPE prediction service 30 may additionally or alternatively send HTTP/HTTPS queries to private network IP addresses. The CPE prediction service 30 may then receive and analyze the banners 38 that are sent as HTTP/HTTPS responses. The banner 38, for example, may include textual data that reveals the vendor:product fields 70-72. The banner 38 may further specify more data, such as HTTP/HTTPS headers, HTML links or content, robots.txt, sitemap.xml, security.txt, favicons, screenshots, web technologies, redirect intermediate data, and hostname. Once the banner(s) 38 is/are acquired, the CPE prediction service 30 may then perform the similarity analysis 80 and generate the similarity score 82 that represents the similarity 84 between the CPE data 34 and the banner 38 associated with the web service 40. The CPE prediction service 30 may then generate the CPE-to-banner match prediction 42 based on the similarity score 82 and the threshold value 86 (as explained with reference to FIGS. 4-6**).

The banners 38 may be regularly scanned. While the banner grabbing operation 112 may be performed according to any schedule or randomness, CPE prediction service 30 may conduct the banner grabbing operation 112 on a bi-weekly basis. The CPE prediction service 30 thus regularly scans IP addresses and exposes the corresponding web service 40.

Figure 11:
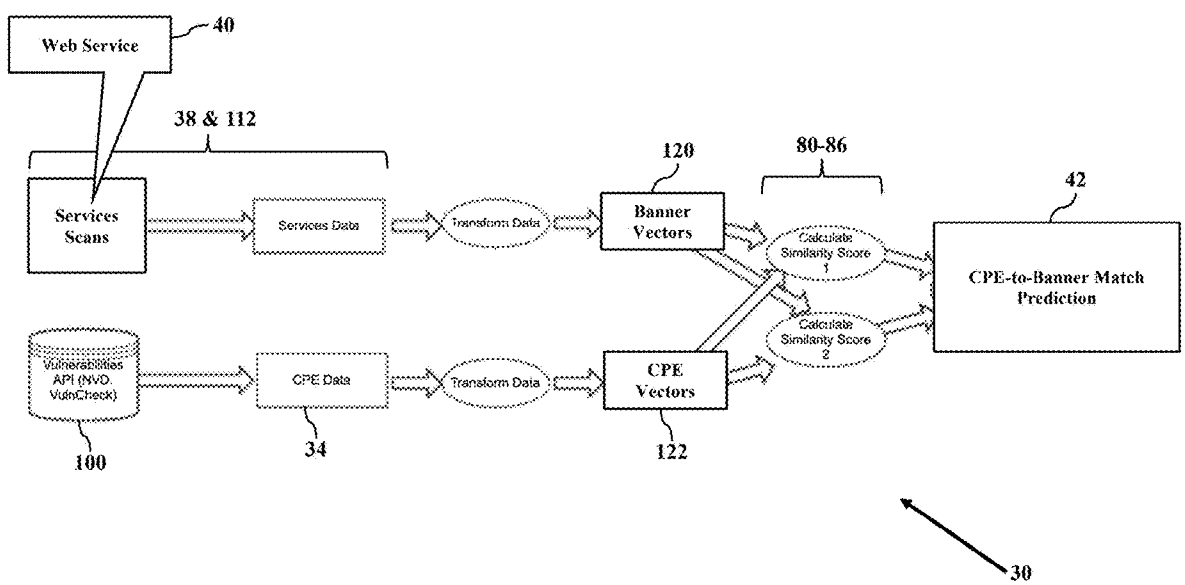
FIG. 11 illustrates a more detailed example of a service architecture.

FIG. 11 illustrates a more detailed example of the service architecture. The CPE prediction service 30 may use unsupervised or supervised machine learning to automatically identify the CPE data 34 across the computer software services 40 scanned by the banner grabbing operation 112 (as explained with reference to FIG. 10). The CPE prediction service 30 pulls the CPE data 34 from the vulnerability systems 100 (such as the National Vulnerability Database, the VULNCHECK system, or other). The CPE prediction service 30 also pulls the service banners 38 (and their corresponding attributes and other metadata) via the banner grabbing operation 112. The CPE prediction service 30 may then transform the CPE data 34 and/or the banners 38 to perform the similarity analysis 80. The CPE prediction service 30, for example, may tokenize the banner data representing the banners 38 and generate banner vectors 120 (as later paragraphs will explain). The banner vectors 120 reflect or represent an importance of a textual word in the banner 38. The CPE prediction service 30, as more examples, may generate CPE vectors 122 that represent the textual words in the CPE data 34. The CPE prediction service 30 may then implement the similarity analysis 80 between the CPE data 34 and the banner 38. The similarity analysis 80 may thus be used to predict which CPE data 34 belongs to the web service 40 specified by the banner 38. Testing has shown that the CPE prediction service 30 identifies more than 2.3 times the number of unique CPEs as existing, conventional rules-based methods, while maintaining a greater than 90% precision.

FIGS. 12-13 illustrate examples of data transformations and feature engineering performed using the banner data representing the banner 38. FIG. 12, for example, illustrates a software services table 130 that may be generated by the CPE prediction service 30 as an electronic record of the banner grabbing operation 112 (as illustrated in FIGS. 10-11). The software services table 130 records the textual service data representing the HTTP/HTTPS response (such as the IP address, the banner 38, and attributes/metadata). The CPE prediction application 56, for example, may instruct the server 26/50 to store the software services table 130 to the local memory device 54 or some other networked location (all illustrated with reference to FIG. 4). While FIG. 12 only illustrates a single response, in practice the banner 38 may reveal multiple computer software services 40 associated with the IP address and/or hostname (such as ['sonicwall:network_security_manager', 'sonicwall:universal_management_appliance', and 'sonicwall:viewpoint']). FIG. 13 illustrates examples of a text feature transformation that concatenates the textual service data representing the HTTP/HTTPS response(s) (e.g., the banner 38).

Figure 14:
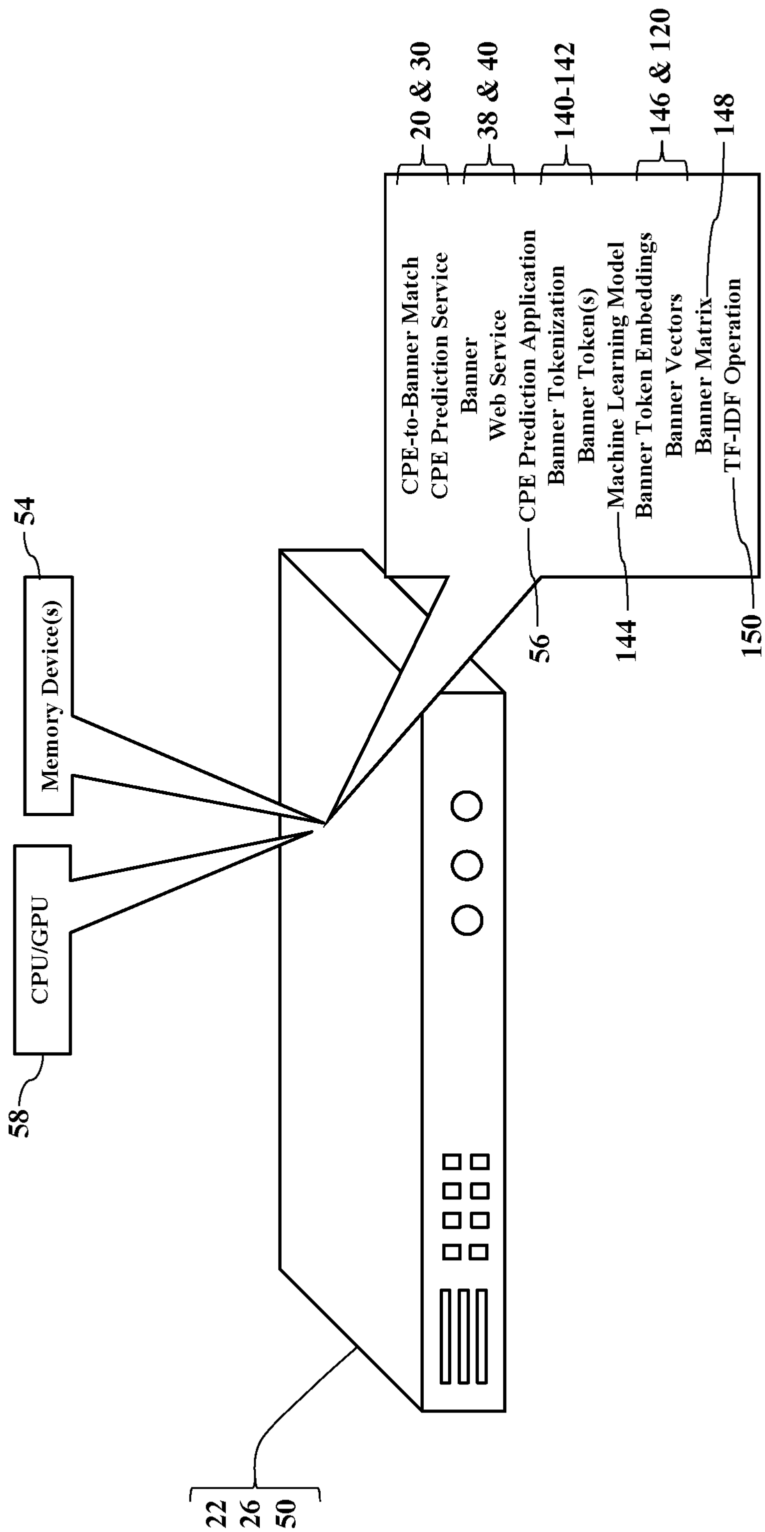

FIGS. 14-15 illustrate more examples of data transformations and feature engineering performed using the banner data representing the service banner 38. Both FIGS. 14 and 15, for example, illustrate a banner tokenization operation 140 using the concatenated textual service data representing the banner 38 (as illustrated in FIG. 13). The CPE prediction application 56 may instruct or cause the server 24 (again illustrated as the rack server 50) to perform operations, such as generating one or more banner tokens 142 that represent the concatenated textual service data representing the banner 38 (as FIG. 13 illustrates). The CPE prediction application 56 may thus tokenize the concatenated textual service data representing the banner 38. The banner tokens 142, for example, represent words, character sets, or combinations of words and punctuation contained within the concatenated textual service data representing the banner 38. A machine learning model 144 (such as a large language model) may tokenize the banner 38 as textual training data and analyze patterns and semantic relationships between the banner tokens 142. After training, the machine learning model 144 may use those patterns and relationships to generate a sequence of output tokens based on the inputted banner tokens 142. The CPE prediction application 56 may use a tokenization scheme or method, such as word tokenization, character tokenization, and subword tokenization, byte-pair encoding, and others as desired. The machine learning model 144 may assign a unique banner token identifier to each banner token 142. The machine learning model 144 may thus represent the banner 38 as a sequence of banner token identifiers. The CPE prediction application 56 may then generate banner token embeddings 146 (using the banner token identifiers) that represent the semantic relationships between the banner tokens 142. Each banner token embedding 146 is assigned to a corresponding one of the banner tokens 142, based on how commonly the corresponding banner token 142 is used together with, or in similar contexts to, the other banner tokens 142. After the machine learning model 144 is trained, the machine learning model 144 may use the learned banner token embeddings 146 to iteratively generate an output. The CPE prediction service 30, as simple examples, may generate the banner tokens 142 that represent the vendor:product fields 74-76 (illustrated in FIG. 7). The CPE prediction application 56 may instruct the server 26/50 to generate a banner matrix 148 representing the banner token embeddings 146 (and the banner vectors 120) using the concatenated textual service data and a term frequency-inverse document frequency (or TF-IDF) operation 150. The TF-IDF operation 150, as a simple explanation, determines the importance of a word in the concatenated textual service data representing the banner 38.

Figure 16:
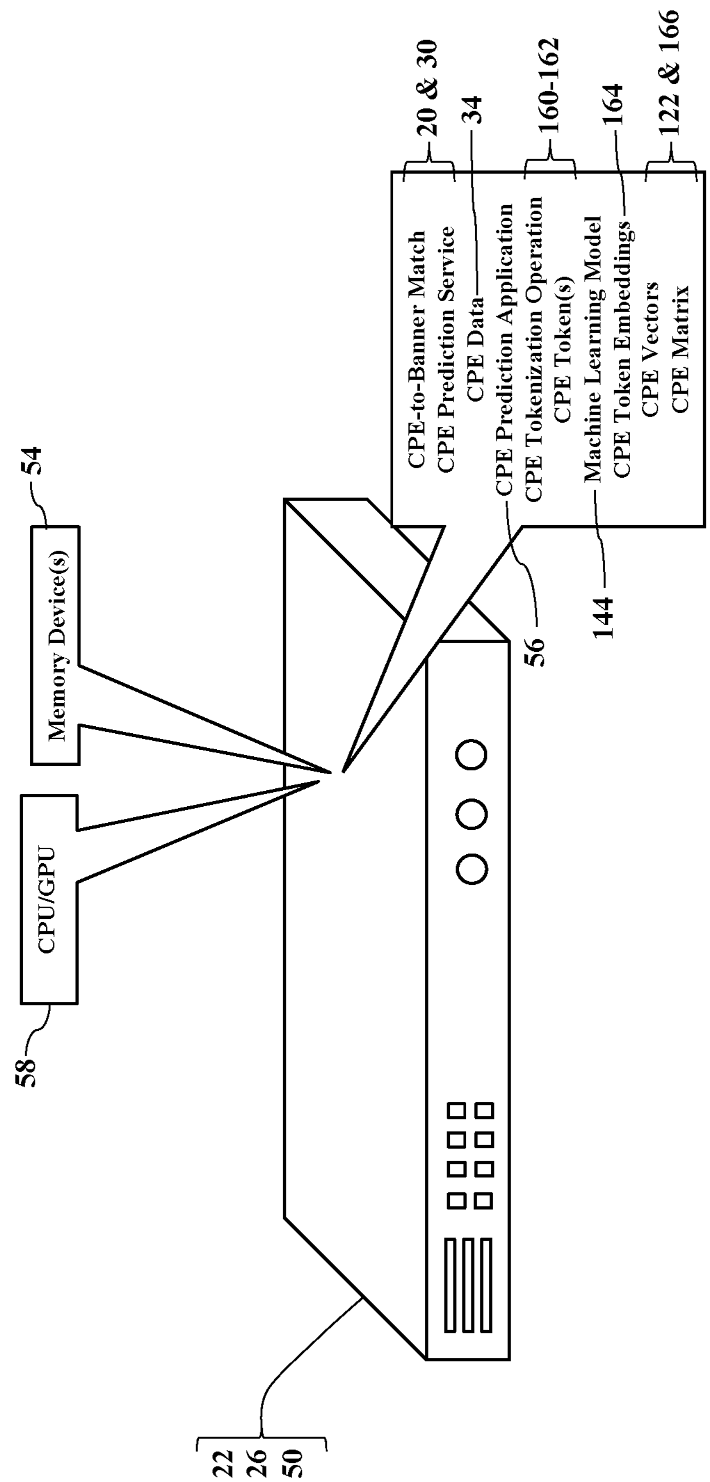

FIG. 16 illustrates examples of data transformations and feature engineering performed using the common platform enumeration (or CPE) data 34. FIG. 16, for example, illustrates a CPE tokenization operation 160 using the CPE data 34. The CPE prediction application 56 may instruct or cause the server 24 (again illustrated as the rack server 50) to perform operations, such as generating one or more CPE tokens 162 that represent the CPE data 34. The CPE prediction application 56 may then use the CPE tokens 162 as training data for the machine learning model 144. The CPE prediction application 56 may thus tokenize the textual CPE data 34 and use machine learning as a predictor engine. The CPE tokens 162 represent words, character sets, or combinations of words and punctuation contained within the textual CPE data 34. The machine learning model 144 (such as a large language model) may tokenize the CPE data 34 as textual training data and analyze patterns and semantic relationships between the CPE tokens 162. After training, the machine learning model 144 may use those patterns and relationships to generate a sequence of output tokens based on the inputted CPE tokens 162. The CPE prediction application 56 may use a tokenization scheme or method, such as word tokenization, character tokenization, and subword tokenization, byte-pair encoding, and others as desired. The machine learning model 144 may assign a unique CPE token identifier to each CPE token 162. The machine learning model 144 may thus represent the textual CPE data 34 as a sequence of CPE token identifiers. The CPE prediction application 56 may then generate CPE token embeddings 164 (using the CPE token identifiers) that represent the semantic relationships between the CPE tokens 162. The CPE token embeddings 164 may also be used to generate the CPE vectors 122 and a CPE matrix 166. Each CPE token embedding 164 is assigned to a corresponding one of the CPE tokens 162, based on how commonly the corresponding CPE token 162 is used together with, or in similar contexts to, the other CPE tokens 162. After the machine learning model 144 is trained, the machine learning model 144 may use the learned CPE token embeddings 164 to iteratively generate an output. The CPE prediction service 30, as simple examples, may generate the CPE tokens 162 as outputs that represent the vendor and/or product fields 70-72 (as illustrated with reference to FIG. 5-6).

Figure 18:
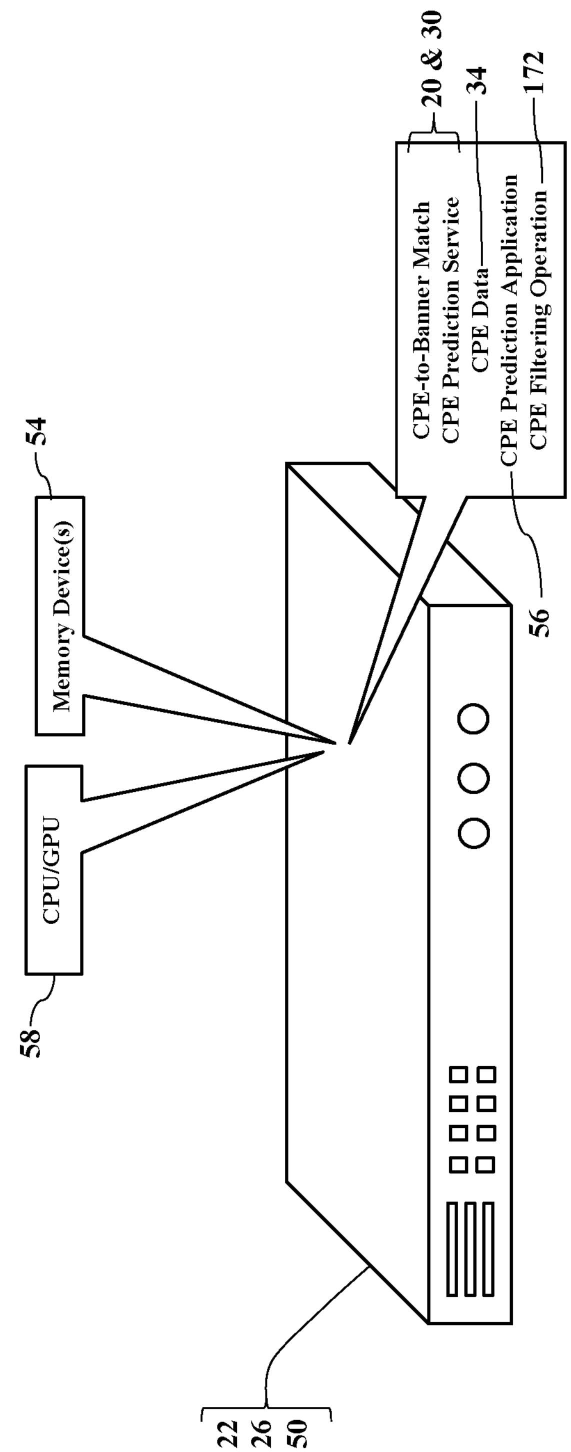

FIGS. 17-20 illustrate more examples of other data transformations and more feature engineering. FIG. 17, for example, illustrates a CPE table 170 that may be generated by the CPE prediction service 30. The CPE table 170 represents an electronic record of the CPE data 34 retrieved from the vulnerability system/service 100 (as explained with reference to FIGS. 8-9). FIG. 18 illustrates a CPE filtering operation 172 performed by the CPE prediction application 56. The CPE prediction application 56, for example, may be configured to search for, and/or filter out or remove, certain specified vendor and/or product fields 70-72 (as illustrated with reference to FIG. 5-6) and/or other search/filter criterion from the CPE data 34 and/or the CPE table 170. As a simple example, the CPE prediction application 56 may be configured or instructed to delete stale, outdated, or unapproved CPE data 34 that represents old, discredited, or deprecated vulnerabilities and solutions. As FIG. 19 illustrates, the CPE prediction application 56 may filter out the CPE data 34 having a proportion of English stopwords in the CPE tokens 162 that equals or exceeds 0.33. FIG. 20 illustrates examples where the CPE prediction application 56 may filter out the CPE data 34 having a proportion of 1-letter product words in the CPE tokens 162 (such as ignoring >6 character words) greater than or equal to 0.5.

FIG. 21 illustrates examples of CPE updates. Software vendors are frequently updating their products and services, and new vendors/products may appear in the market. The CPE prediction service 30 may thus periodically/randomly check for new/latest/update CPE data 34 from the vulnerability system 100 (as explained with reference to FIGS. 8-9). FIG. 21 thus illustrates features generated from the CPE data 34 and/or the CPE table 170.

Figure 22:
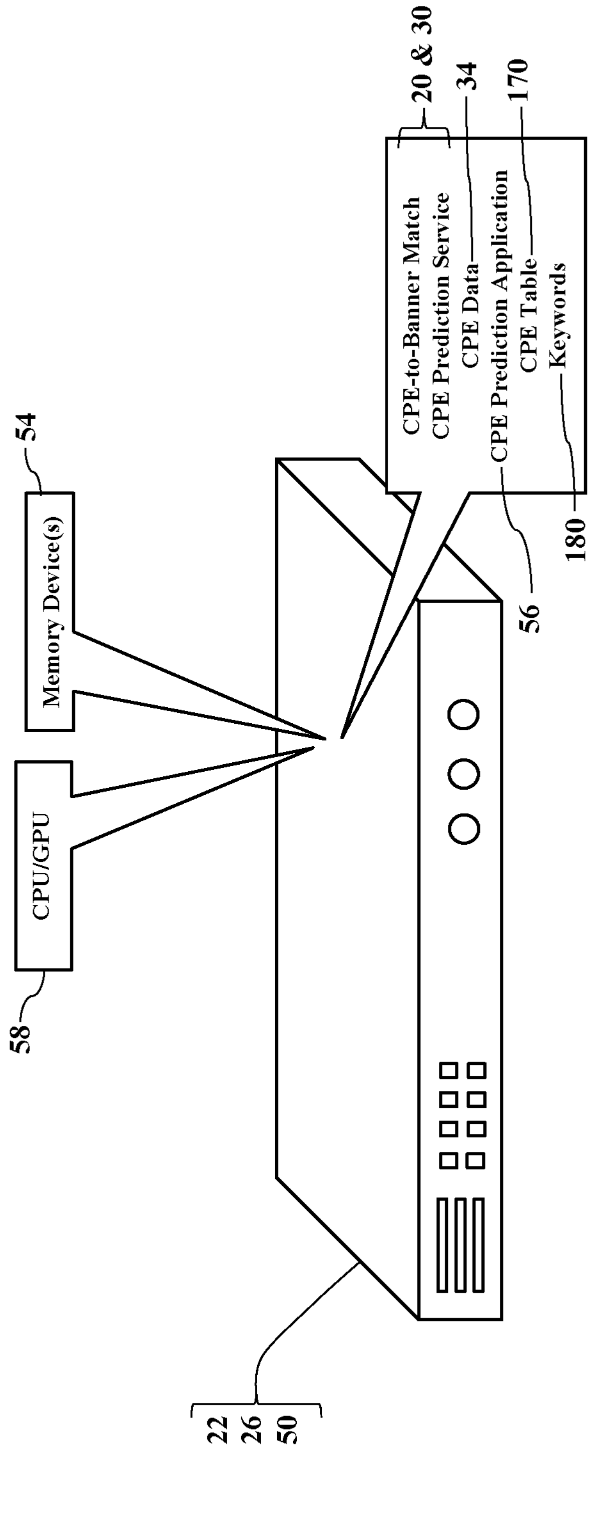
Figure 24:
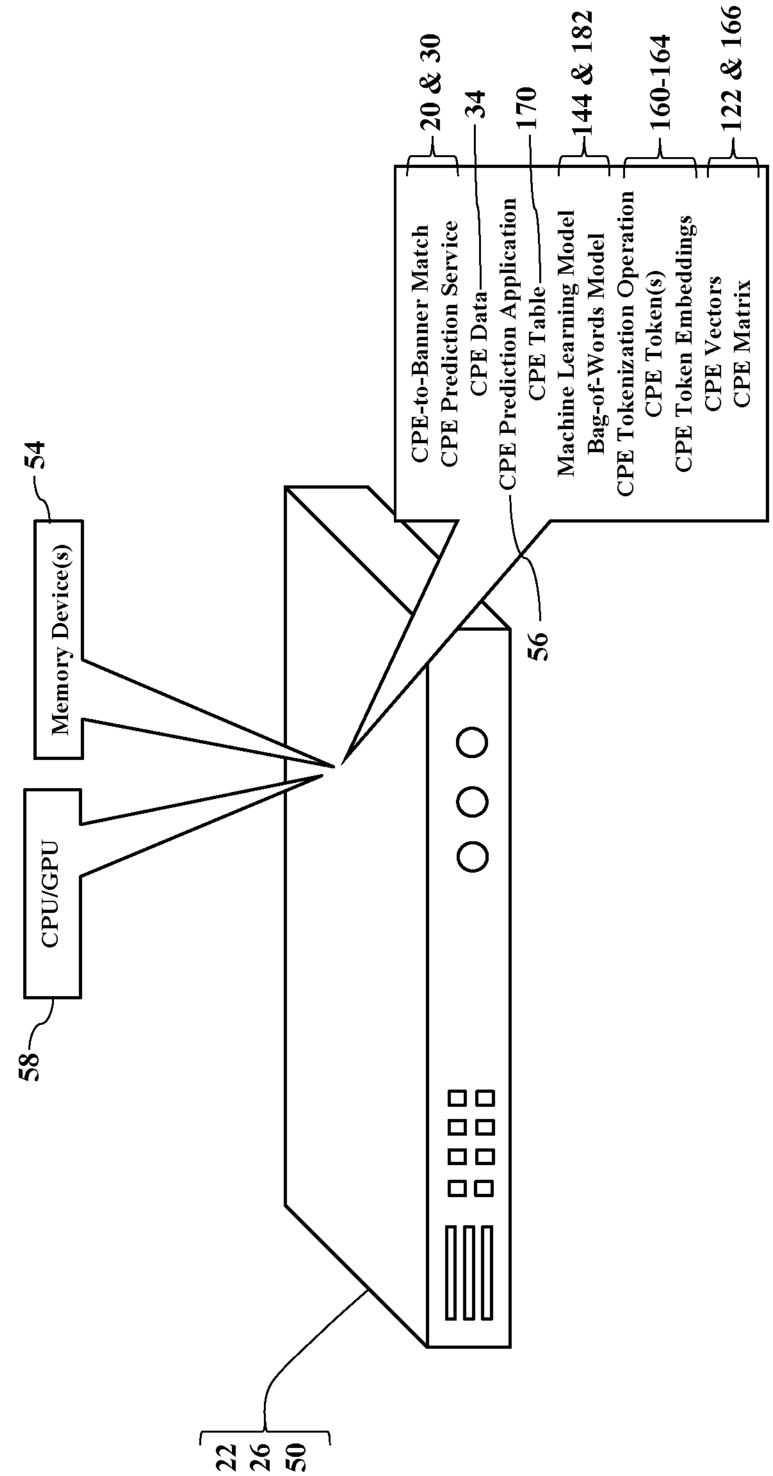

FIGS. 22-25 illustrate more examples of machine learning. The vendor and/or product fields 70-72 (as illustrated with reference to FIG. 5-6) in the CPE data 34 and/or the CPE table 170 may be helpfully indicative of the web service 40 (as above explained). As FIGS. 22-23 illustrate, the CPE prediction service 30 and/or the CPE prediction application 56 may be configured to extract one or more keywords 180 from the CPE data 34 and/or the CPE table 170. As FIGS. 24-25 illustrate, the CPE prediction application 56 may generate the CPE vectors 122 that represent the textual words in the CPE data 34. The CPE prediction application 56, for example, may use a bag-of-words model 182 (such as CountVectorizer from www.sciket-learn.org) to convert the textual CPE data 34 into the CPE matrix 166 representing the CPE vectors 122. The CPE vectors 122 may thus represent word counts in the CPE data 34.

The CPE prediction service 30 may thus preprocess the service banner 38 and the CPE data 34. The CPE prediction application 56, for example, may tokenize the CPE data 34 in the CPE table 170 and extract the keywords 180. The CPE prediction application 56 may concatenate the banner data representing the banner(s) 38 (including attributes and other metadata). The CPE prediction application 56 may further oversample the banner data representing the banner(s) 38 and/or the CPE data 34, such as data areas or fields 70-72 where the product and the vendor names are commonly found. Moreover, the CPE prediction application 56 may filter the banner 38 and/or the CPE data 34 to vendor:product combinations, filter to only application CPEs, filter out deprecated CPEs, and/or filter out CPEs with high proportion of stopwords or 1-letter words. The CPE prediction application 56 may tokenize the banner data representing the banner(s) 38, generate word embeddings (such as the banner token embeddings 146), and generate the banner matrix 148. The CPE prediction application 56 may also tokenize the CPE data 34, create word embeddings (such as the CPE token embeddings 164), and generate the CPE matrix 166 (e.g., a bag-of-words matrix representing the CPE data 34).

Figure 26:
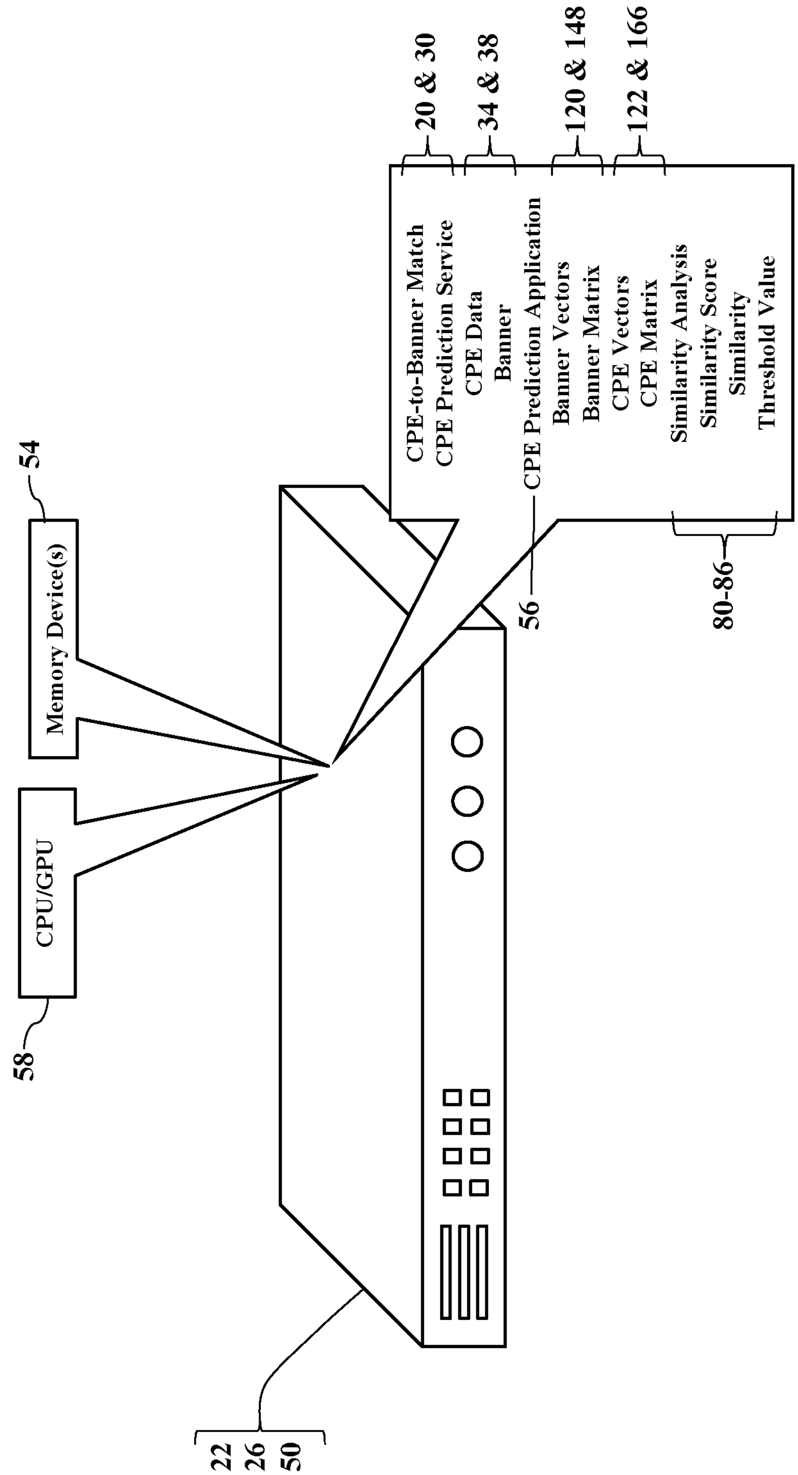

FIGS. 26-27 illustrate more examples of the similarity analysis 80. When the CPE prediction application 56 generates the banner matrix 148 (representing the banner vectors 120) and the CPE matrix 166 (representing the CPE vectors 122), the CPE prediction application 56 may perform operations that execute the similarity analysis 80. There are many different similarity analyses 80, and the CPE prediction application 56 may be custom configured or programmed to perform a desired variant of the similarity analyses 80. As a simple example, the CPE prediction application 56 may generate the similarity score 82 by taking the dot product of the banner matrix 148 and the CPE matrix 166 transposed, divided by the sum of the CPE matrix 166 along axis 1, according to $$A \cdot B^T \Big/ \sum_j b_{ij}$$

where A represents the banner matrix 148, B represents the CPE matrix 166, and $B^T$ represents the transpose of the CPE matrix 166. As FIG. 27 illustrates, the result or output is the similarity score 82 representing a word overlap score, perhaps weighted by the term frequency-inverse document frequency (or TF-IDF) operation 150 (illustrated in FIG. 14) applied to the banner matrix 148.

Figure 28:
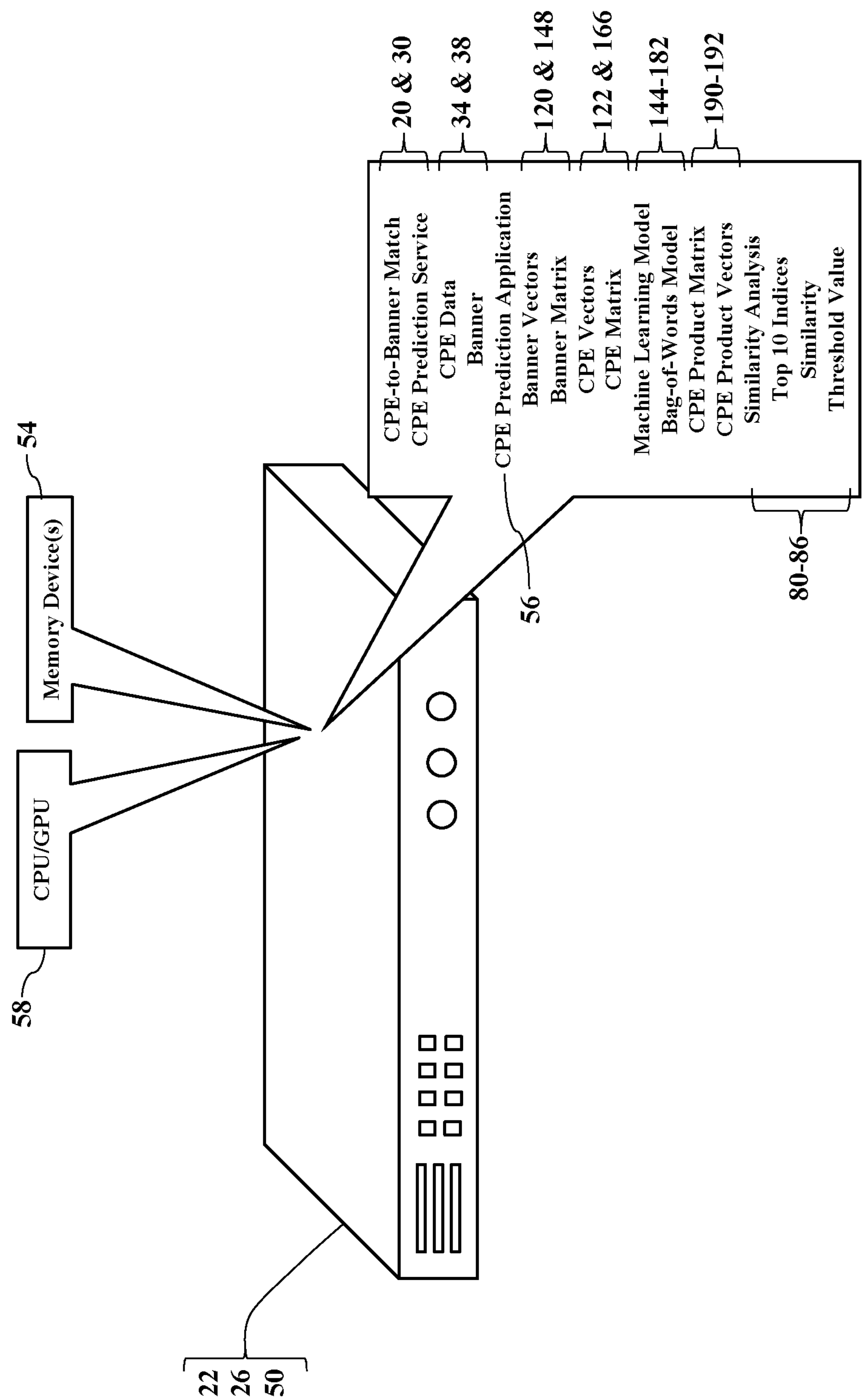
Figure 29:
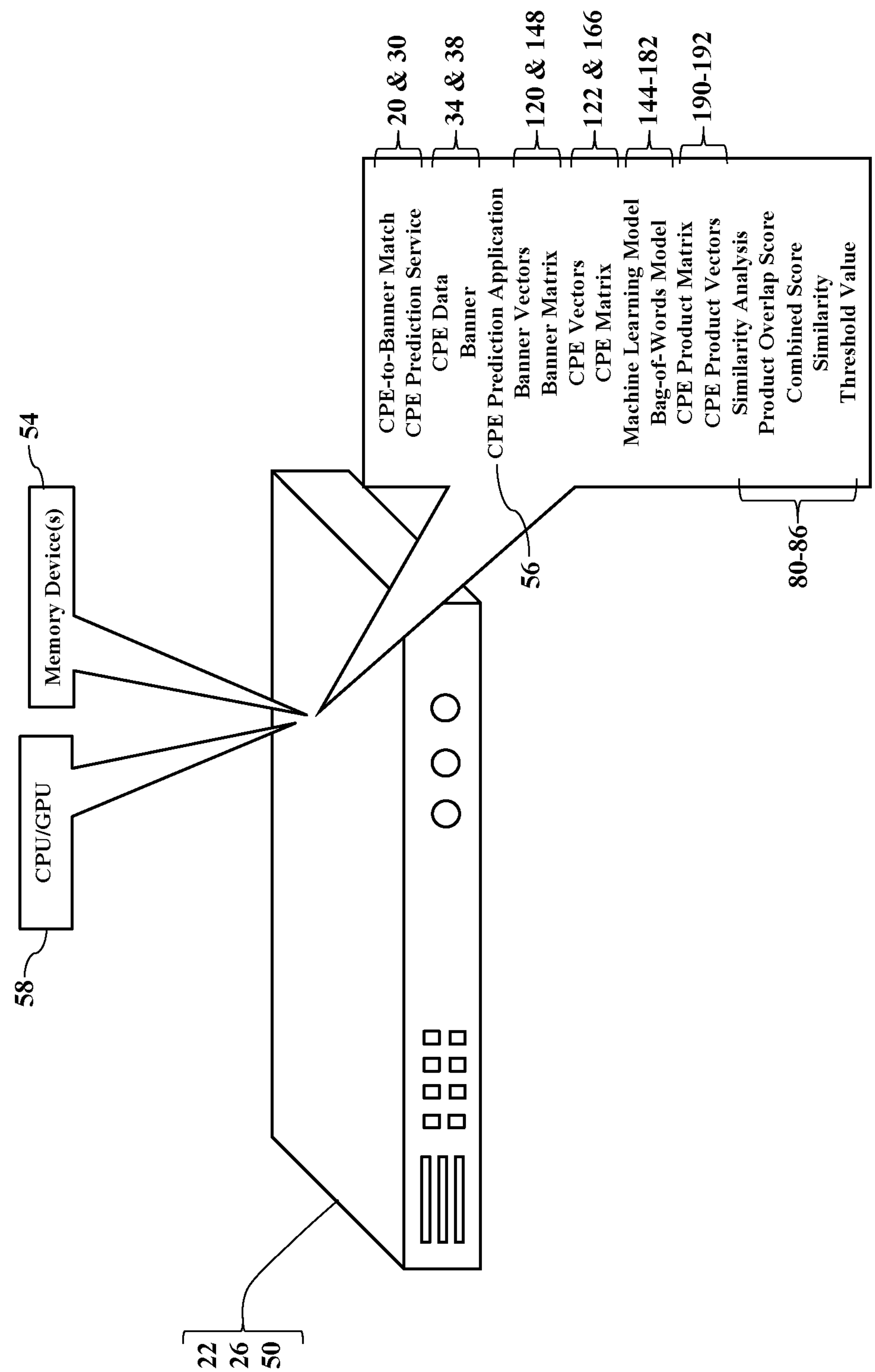

FIGS. 28-29 illustrate still more examples of the similarity analysis 80. The CPE prediction application 56 may generate the banner matrix 148 and the CPE matrix 166. The CPE prediction application 56, however, may also use the bag-of-words model 182 to convert the textual CPE data 34 (perhaps specifying the vendor/product data fields 70-72 illustrated in FIGS. 5-6) into a CPE product matrix 190 representing CPE product vectors 192. The CPE product vectors 192 may thus represent word counts in the textual CPE data 34 specifying the product data field 72. Suppose, for example, that the CPE data 34 specifies only a single (1) vendor. The CPE prediction application 56 may generate the similarity score 82 as the top N indices. That is, for each web service 40, the CPE prediction application 56 may extract the top (such as N=10) indices of the CPE matrix 166 according to the highest similarity score 82. As FIG. 29 illustrates, in another example, the CPE prediction application 56 may generate the similarity score 82 as a product overlap score by converting the matrices 148/166/190 to binary values and performing same above matrix calculation, but the CPE prediction application 56 replaces the CPE matrix 166 with the CPE product matrix 190 to get product token overlap. As still another example, the CPE prediction application 56 may generate the similarity score 82 as a combined similarity score (such as [(4*(similarity score)+product overlap score)/5]. This combined similarity score 82 combines the similarity score 82 with the product overlap score. The value of the combined similarity score 82, for example, may need to exceed zero (0) or otherwise the CPE data 34 may be disregarded.

Figure 30:
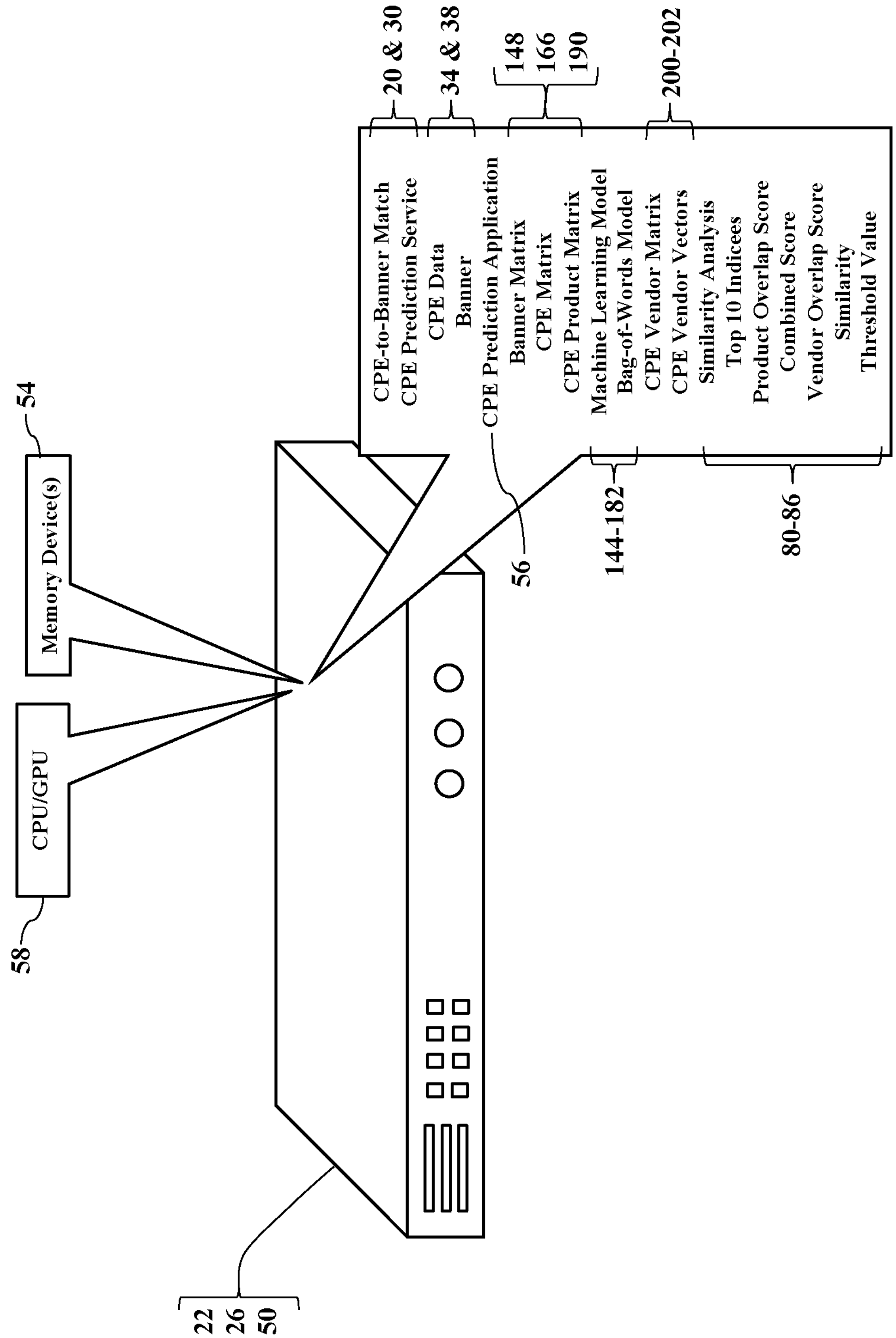

FIG. 30 illustrates even more examples of the similarity analysis 80. There may be instances where the CPE data 34 specifies multiple vendors. The CPE data 34, for example, may have multiple vendor:product combinations specified by the data fields 70-72 (illustrated in FIGS. 5-6). In these cases, the CPE prediction application 56 may generate the banner matrix 148, the CPE matrix 166, and the CPE product matrix 190. The CPE prediction application 56, however, may also use the bag-of-words model 182 to convert the textual CPE data 34 specifying the vendor in data field 70 into a CPE vendor matrix 200. CPE vendor vectors 202 may thus represent word counts in the textual CPE data 34 specifying the vendors in data field(s) 70. The CPE prediction application 56 may generate the similarity score 82 using combinations of the banner matrix 148, the CPE matrix 166, the CPE product matrix 190, and the CPE vendor matrix 200. The CPE prediction application 56, for example, may generate the similarity score 82 as the top N indices, the product overlap score, and/or the combined similarity score 82. The CPE prediction application 56, however, may generate the similarity score 82 as a vendor overlap score by converting the matrices 148/166/190/200 to binary values and performing same above matrix calculation, but the CPE prediction application 56 replaces the CPE matrix 166 with the CPE vendor matrix 200 to get vendor token overlap. The CPE prediction application 56 may also generate the similarity score 82 as a combined multi-similarity score (such as (combined similarity score+vendor overlap score)/2). This combined multi-similarity score 82 combines the combined similarity score 82 with the vendor overlap score. The value of the vendor overlap score, for example, may need to exceed zero (0) or otherwise the CPE data 34 may be disregarded.

FIG. 31 illustrates examples of the CPE-to-banner match 20 and the CPE-to-banner match prediction 42. The value of the similarity score 82 (perhaps in relation to the threshold value 86) may determine the CPE-to-banner match 20 and the CPE-to-banner match prediction 42. If the similarity score 82 equals or exceeds the threshold value 86, for example, then the CPE data 34 sufficiently matches or resembles the service banner 38 (as explained with reference to FIG. 4). The CPE prediction application 56 may thus predict that the CPE data 34 is sufficiently similar to the banner 38 and is associated with the web service 40. Because the CPE data 34 is associated with the web service 40, the CPE prediction application 56 may further determine the vendor 90 and the product 92 associated with the web service 40, based on the vendor data fields 70/74 and product data fields 72/76 specified by the banner 38 and/or by the CPE data 34. The CPE prediction service 30 may thus identify novel CPE products and vendors. The CPE prediction service 30 elegantly uses data mining to discover new relationships between CPEs and web services 40.

The CPE prediction application 56 may output multiple CPEs with similarity scores 82 based on the embeddings (such as 146 & 164). Some of the embeddings, though, may be the false positive matches 94 (as explained with reference to FIG. 4). In order to only reveal the most similar CPEs, the threshold value 86 may be configured as a cutoff, above which CPEs pass through as true positive matches 88 (as also explained with reference to FIG. 4). Increasing threshold value 86 increases precision, but perhaps at the expense of identifying fewer CPEs and potentially having more false positive matches 94.

The CPE prediction application 56 may thus be tuned to suit performance objectives. In order to get an actual efficacy measure and tune the CPE prediction service 30 accordingly, the CPE data 34 and the banners 38 were labeled by human cybersecurity experts. The minimum sample size was calculated required to obtain a 95% confidence level and 5% margin of error. The CPE-to-banner match prediction 42 was thus expertly evaluated as either the true positive matches 88 or the false positive matches 94. The value of the threshold value 86 was increased/decreased to achieve 95% confidence level.

Figure 32:
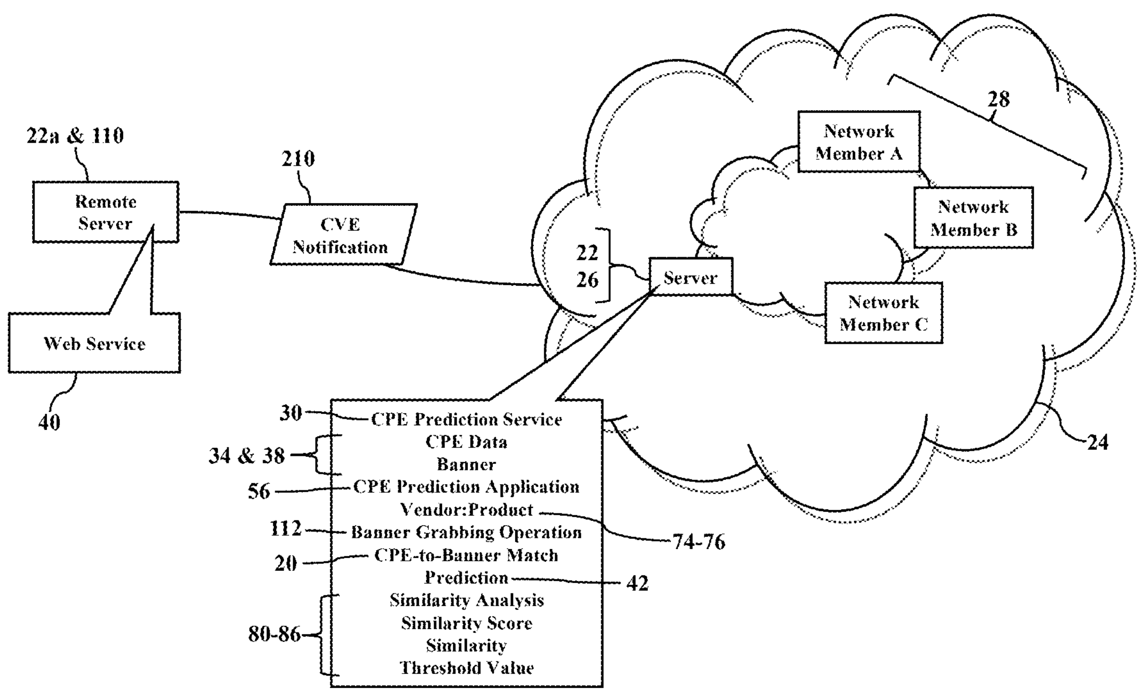
FIG. 32 illustrates more examples of improved computer functioning.

FIG. 32 illustrates more examples of improved computer functioning. The computer system 22 (again illustrated as the server 26) retrieves or acquires the common platform enumeration (or CPE) data 34. The server 26 also retrieves or acquires the service banner(s) 38 associated with the software-based web service 40. The server 26 provides the CPE prediction service 30 that matches the CPE data 34 to the web service 40, based on the banner data representing the banner(s) 38. The CPE prediction application 56, for example, programs the server 26 to perform operations for the similarity analysis 80 between the CPE data 34 and the banner(s) 38. The server 26 may thus generate the CPE-to-banner match prediction 42 based on the similarity score 82 and comparisons to the threshold value 86. If the similarity score 82 equals, exceeds, or otherwise satisfies the threshold value 86, then the CPE prediction application 56 programs the server 26 to predict that the CPE data 34 is the true positive match 88 with the web service 40. Because the CPE data 34 is associated with the web service 40, the CPE prediction application 56 may further determine that the corresponding common vulnerabilities and exposures (or CVE) data 36 also matches the web service 40. The CVE data 36, in other words, describes the known cybersecurity vulnerabilities, exposures, and other cyberthreats associated with the web service 40.

The CPE prediction service 30 may thus initiate cybersecurity remedial actions. Once the CPE/CVE data 34/36 is/are matched to the web service 40, the CPE prediction service 30 may implement operations that resolve the known cybersecurity vulnerabilities, exposures, and other cyberthreats associated with the web service 40. In FIG. 32, for example, the CPE prediction application 56 may program the server 26 to generate and to send a CVE notification 210 to a network address (e.g., IP address) associated with the web service 40. FIG. 32, for simplicity, illustrates the CVE notification 210 routing to the remote server **22*a*/110 providing the web service 40. When the web service 40 and/or the remote server 22*a*/110 receives the CVE notification 210, the web service 40 and/or the remote server 22*a*/110 may be programmed to read the CVE notification 210 and obtain the CVE data 36 describing the known cybersecurity vulnerabilities, exposures, and other cyberthreats associated with the web service 40. As a simple example, the CVE notification 210 may have electronic content identifying the vendor:product data fields 74-76 obtained from the CPE data 34. The CVE notification 210 may further have electronic content identifying cybersecurity vulnerabilities, exposures, and other CVE data 36 associated with the vendor:product data fields 74-76. Simply put, the CVE notification 210 alerts the web service 40 that some portion of its software programming/services are out-of-date or otherwise vulnerable to cybersecurity threats. The web service 40 and/or the remote server 22*a*/110 may thus initiate software updates, patches, and other remedial operations that resolve the cyberthreats. The CPE prediction service 30 may thus alert web services 40 and servers 22*a*/110 to the CVE data 36** that improves computer functioning.

The CPE prediction service 30 thus monitors product exposure. As users, customers, and organizations scale their networks, their product/computer exposure becomes increasingly difficult to monitor. Unknown, Internet-facing exposed assets leave severe blind spots for IT management. Most of these assets go unrecognized, and software products/services are riddled with unpatched, vulnerable programming. Threat actors are often motivated to take advantage of these vulnerable assets. The CPE prediction service 30, though, allows users, customers, and organizations to understand which CPEs are running on which assets. The CPE prediction service 30 reveals blind spots, from understanding CVE exposure to identifying products affected by Zero-Day vulnerabilities. Some conventional, rules-based schemes identify popular/prominent products, but it's impractical to implement rules for a wide variety of products and services. Indeed, many older/niche products are equally as prominent, revealing a long-tail where a substantial number of services are still represented by a large volume of less popular products. Due to the sheer volume of unique products in the wild, it's impractical to cover all products using rules-based methods.

The CPE prediction service 30, however, automatically monitors product exposure using elegant banner similarity. The CPE prediction service 30 creates service and CPE word embeddings (e.g., the banner token embeddings 146 and the CPE token embeddings 164) and computes the CPE similarity (such as 80-86) in a vector space. The CPE prediction service 30 represents an unsupervised machine learning framework that learns from the web service 40 and the CPE data 34. The CPE prediction service 30 maps natural language into vector space representations, and the CPE prediction service 30 discovers CPEs by comparing each web service embedding to each CPE embedding (e.g., the banner token embeddings 146 and the CPE token embeddings 164) to compute the similarity scores 82 and to find the top similar matches in a vector space. The CPE prediction service 30 may tokenize the CPEs (e.g., the CPE tokenization operation 160) to create a CPE vocabulary. The CPE prediction service 30 may oversample some portions of the CPE data 34 (such as the CPE product matrix and vectors 190-192), as the product data field 72 may be more important to identify, and a better indicator, than vendor 70. The CPE prediction service 30 may fit the TF-IDF operation 150 to the service banners 38 and banner attributes of each web service 40 using the CPE vocabulary. The CPE prediction service 30 may thus implement the TF-IDF operation 150 to determine a text/word relevancy in the service banners 38. The CPE prediction service 30 may oversample more important areas (such as "Server" illustrated in FIG. 7, and/or "OrganizationName" attributes). The CPE prediction service 30 may calculate the custom similarity score 82 between sparse matrices 148 & 166 and compare to the threshold value 86. The threshold value 86, for example, may be learned by optimizing against a validation set of known CPEs. The CPE prediction service 30 thus automatically identifies and matches CPEs across web services 40 scanned through external surface methods (such as publicly facing Internet ports). The CPE prediction service 30 pulls the CPE data 34 from any central vulnerabilities database (such as the vulnerability system 100) as well as the service banners 36 and attributes from the external surface scans. The banners 36 and attributes refer to text banners from banner grabbing and HTML responses from HTTP/S requests (such as the banner grabbing operation 112). Sparse word matrices 148 & 166 are created using the tokens 142 & 162, which are used to compute the custom similarity score 82. The CPE prediction service 30 thus represents an unsupervised machine learning framework of identifying CPEs for given web services 40. The CPE prediction service 30 implements an entirely new approach by relying on embedding similarity scoring to find CPEs.

Computer functioning is further improved. The CPE prediction service 30 incorporates machine learning to match CPEs based on word embedding similarity of CPEs and internet scans. The CPE prediction service 30 maps scan responses to vector space, learns from the underlying data distributions, and takes advantage of the custom similarity metric to solve a known security challenge. The CPE prediction service 30, in particular, provides a CPE identification framework which works at scale and matches a substantial number of CPEs, perhaps even all, that requires little, if any, manual manpower. The CPE prediction service 30 uses passive scanning to identify more CPEs than active scanning in a less intrusive and much quicker manner. The CPE prediction service 30 adapts to the underlying CPE data 34 and banner 38 to compute the similarity scores 82 and map to relevant CPEs in a vector space. Using matrix calculations that take into account the entire word corpus from scans (i.e., metrics such as the TF-IDF operation 150), the CPE prediction service 30 implements dynamic, data-learned similarity scoring as opposed to hard-coded, static rules used by conventional schemes. The CPE prediction service 30 is not limited to web services that match regular expressions, as conventional schemes. The CPE prediction service 30, instead, focuses on vendor and product similarity. The CPE prediction service 30 uses embeddings (e.g., the banner token embeddings 146 and the CPE token embeddings 164) to understand word tokens within the global and local context of service scans. The CPE prediction service 30 thus avoids false positives with more generic CPE tokens 162. The CPE prediction service 30 thus implements a similarity-based approach that is learned from the underlying data. The CPE prediction service 30 identifies and matches CPEs based on partial overlap that is weighted by the TF-IDF scores of sampled tokens. This creates a similarity measure from 0 to 1 instead of an arbitrary ranking or a binary match/no match decision. The CPE prediction service 30 not only uses the service banners 38, but the CPE prediction service 30 may also harvest and use HTML response banners. The CPE prediction service 30 uses the banner 38 as an entirely new data source to find CPE matches both within banners and HTML responses.

Computer functioning is further improved. The CPE prediction service 30 matches the CPE data 34 to the web service 40 using greatly reduced hardware (e.g., processor and memory) and network resources. By predicting matches between the CPE data 34 and the web service 40, the CPE prediction service 30 uses less processor cycles memory bytes than conventional rules-based schemes. Network packet traffic is greatly reduced, as the predicted false positive matches 94 may be immediately/initially dropped from further analysis. Moreover, by more accurately predicting matches the CPE data 34 to the web service 40, cybersecurity threats are more quickly determined and more quickly resolved/patched. Simply put, substantial computer resources may be reduced and reallocated, and substantial electrical power is concomitantly conserved.

Figure 33:
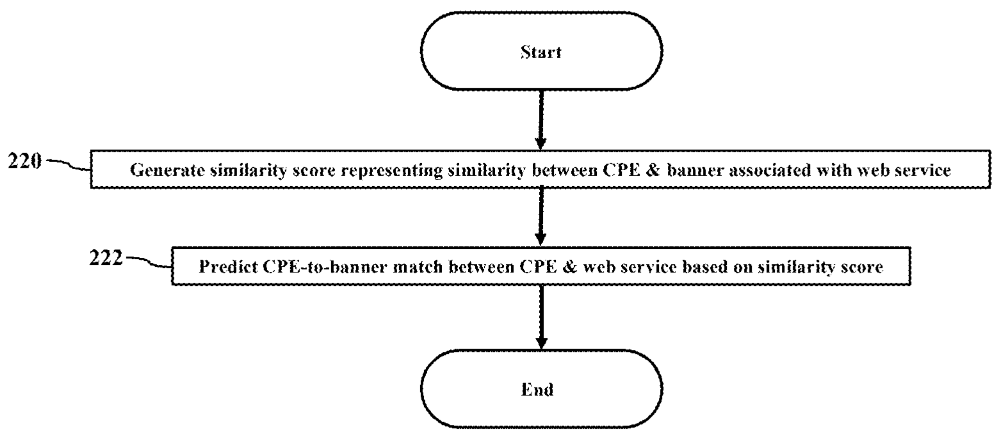
FIGS. 33-35 illustrate examples of methods or operations that match common platform enumeration (CPE) data to a web service.

FIG. 33 illustrates examples of methods or operations that match the common platform enumeration (CPE) data 34 to the web service 40. The computer system 22 generates the similarity score 82 representing the similarity 84 between the CPE data 34 and the banner 38 associated with the web service 40 (Block 220). The computer system 22 predicts the CPE-to-banner match 20 between the CPE data 34 and the web service 40 based on the similarity score 82 representing the similarity 84 between the CPE data 34 and the banner 38 (Block 222).

Figure 34:
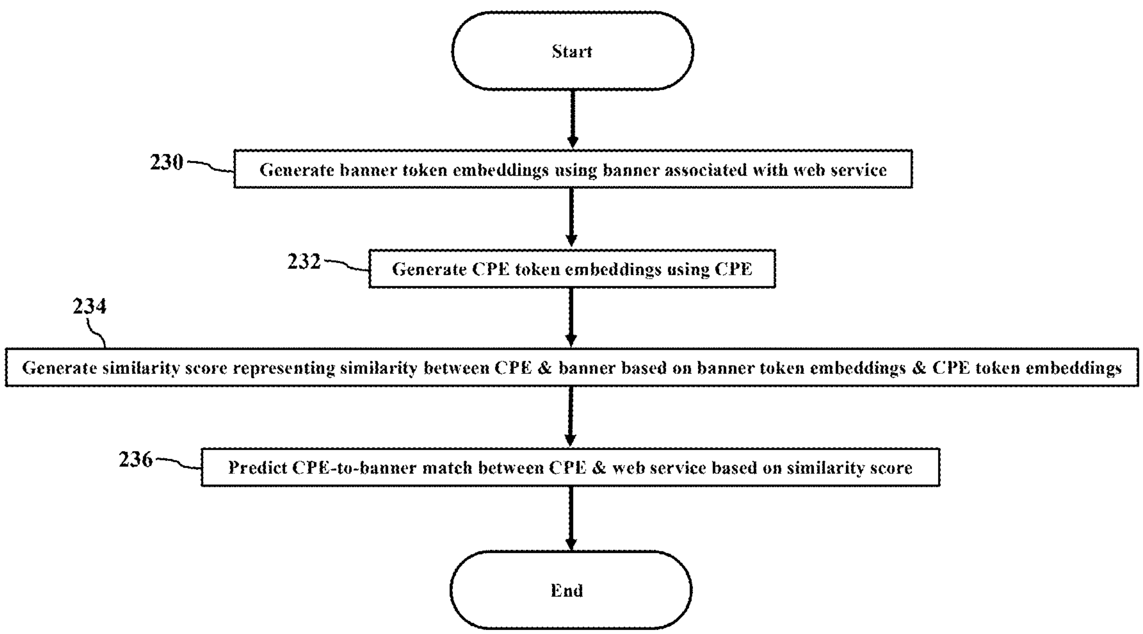

FIG. 34 illustrates more examples of methods or operations that match the common platform enumeration (CPE) data 34 to the web service 40. The banner token embeddings 146 are generated using the banner 38 associated with the web service 40 (Block 230). The CPE token embeddings 164 are generated using the CPE data 34 (Block 232). The similarity score 82 is generated that represents the similarity 84 between the CPE data 34 and the banner 38 based on the banner token embeddings 146 and the CPE token embeddings 164 (Block 234). The CPE-to-banner match 20 is predicted between the CPE data 34 and the web service 40 based on the similarity score 82 (Block 236).

Figure 35:
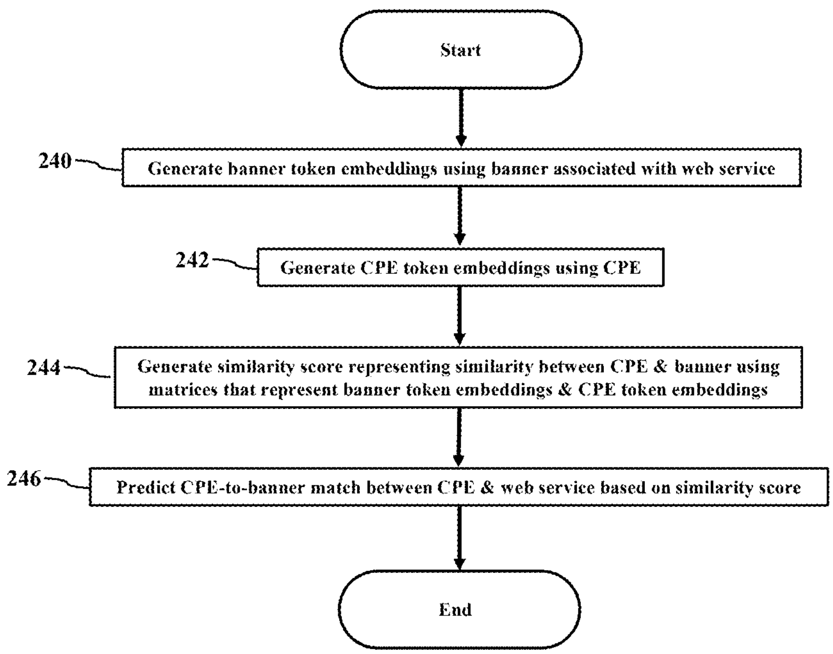

FIG. 35 illustrates more examples of methods or operations that match the common platform enumeration (CPE) data 34 to the web service 40. The banner token embeddings 146 are generated using the banner 38 associated with the web service 40 (Block 240). The CPE token embeddings 164 are generated using the CPE data 34 (Block 242). The similarity score 82 is generated that represents the similarity 84 between the CPE data 34 and the banner 38 using the matrices 148 and 166 that represent the banner token embeddings 146 and the CPE token embeddings 164 (Block 244). The CPE-to-banner match 20 is predicted between the CPE data 34 and the web service 40 based on the similarity score 82 (Block 246).

Figure 36:
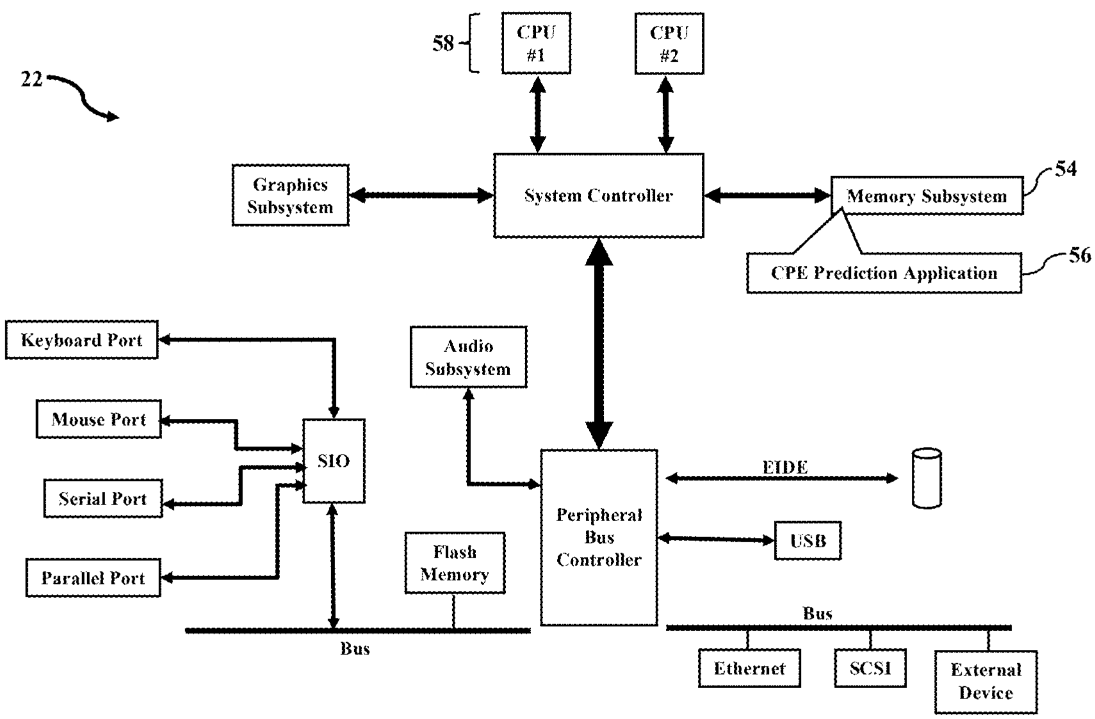
FIG. 36 illustrates a more detailed example of the operating environment.

FIG. 36 illustrates a more detailed example of the operating environment. FIG. 35 is a more detailed block diagram illustrating the computer system 22. The cybersecurity CPE prediction application 56 is stored in the memory subsystem or device 54. One or more of the hardware processors 58 communicate with the memory subsystem or device 54 and execute the cybersecurity CPE prediction application 56. Examples of the memory subsystem or device 54 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and any other read/write memory technology.

The computer system 22 may have any embodiment. This disclosure mostly discusses the computer system 22 as the server 26 and the remote server 110. The CPE prediction service 30, however, may be easily adapted to mobile computing, wherein the computer system 22 may be a smartphone, laptop or desktop computer, a switch/router, a tablet computer, or a smartwatch. The CPE prediction service 30 may also be easily adapted to other embodiments of smart devices, such as a television, an audio device, a remote control, and a recorder. The CPE prediction service 30 may also be easily adapted to still more smart appliances, such as washers, dryers, and refrigerators. Indeed, as cars, trucks, and other vehicles grow in electronic usage and in processing power, the CPE prediction service 30 may be easily incorporated into any vehicular controller.

The above examples of the CPE prediction service 30 may be applied regardless of communications networking technology and networking environment. The CPE prediction service 30 may be easily adapted to stationary or mobile devices having wide-area networking (e.g., 4G/LTE/5G/6G cellular), wireless local area networking (WI-FIR), near field, and/or BLUETOOTH® capability. The CPE prediction service 30 may be applied to stationary or mobile devices utilizing any portion of the electromagnetic spectrum and any signaling standard (such as the IEEE 802 family of standards, GSM/CDMA/TDMA or any cellular standard, and/or the ISM band). The CPE prediction service 30, however, may be applied to any processor-controlled device operating in the radio-frequency domain and/or the Internet Protocol (IP) domain. The CPE prediction service 30 may be applied to any processor-controlled device utilizing a distributed computing network, such as the Internet (sometimes alternatively known as the "World Wide Web"), an intranet, a local-area network (LAN), and/or a wide-area network (WAN). The CPE prediction service 30 may be applied to any processor-controlled device utilizing power line technologies, in which signals are communicated via electrical wiring. Indeed, the many examples may be applied regardless of physical componentry, physical configuration, or communications standard(s).

Operating environments may utilize any processing component, configuration, or system. For example, the CPE prediction service 30 may be easily adapted to execute by a desktop, mobile, or server central/graphical processing unit 58 or chipset offered by INTEL®, ADVANCED MICRO DEVICES®, ARM®, APPLE®, TAIWAN SEMICONDUCTOR MANUFACTURING®, QUALCOMM®, or other manufacturer. The computer system 22 may even use multiple central CPUs/GPUs/cores or chipsets, which could include distributed processors or parallel processors in a single machine or multiple machines. The CPUs/GPUs/cores or chipsets can be used in supporting a virtual processing environment. The CPUs/GPUs/cores or chipsets could include a state machine or logic controller. When any of the CPUs/GPUs/cores or chipsets execute instructions to perform "operations," this could include the CPUs/GPUs/cores or chipsets performing the operations directly and/or facilitating, directing, or cooperating with another device or component to perform the operations.

The CPE prediction service 30 may use packetized communications. When the computer system 22 and the cloud computing environment 24 communicate, information may be collected, sent, and retrieved. The information may be formatted or generated as packets of data according to a packet protocol (such as the Internet Protocol). The packets of data contain bytes of data describing the contents, or payload, of a message. A header of each packet of data may be read or inspected and contain routing information identifying an origination address and/or a destination address.

The CPE prediction service 30 may utilize any signaling standard. The cloud computing environment 24 may mostly use wired networks to interconnect the network members 28. However, the cloud computing environment 24 may utilize any communications device using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or any variant of the GSM/CDMA/TDMA signaling standard. The cloud computing environment 24 may also utilize other standards, such as the I.E.E.E. 802 family of standards, the Industrial, Scientific, and Medical band of the electromagnetic spectrum, BLUETOOTH®, low-power or near-field, and any other standard or value.

The CPE prediction service 30 may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for matching the common platform enumeration (CPE) data 34 to the web service 40, as the above paragraphs explain.

The diagrams, schematics, illustrations, and tables represent conceptual views or processes illustrating examples of cloud services malware detection. The functions of the various elements shown in the figures may be provided through the use of dedicated hardware as well as hardware capable of executing instructions. The hardware, processes, methods, and/or operating systems described herein are for illustrative purposes and, thus, are not intended to be limited to any particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A method executed by a computer system that matches a common platform enumeration (CPE) to a web service, comprising:

generating, by the computer system, a similarity score representing a similarity between the CPE and a banner associated with the web service; and predicting, by the computer system, a match between the CPE and the web service based on the similarity score representing the similarity between the CPE and the banner.

2. The method of claim 1, further comprising banner grabbing the banner associated with the web service.

3. The method of claim 1, wherein in response to the similarity score satisfying the threshold value, then further comprising predicting a true positive match between the CPE and the web service.

4. The method of claim 1, wherein in response to the similarity score failing to satisfy the threshold value, then further comprising predicting a false positive match between the CPE and the web service.

5. The method of claim 1, further comprising determining a product associated with the CPE based on the similarity score representing the similarity between the CPE and the banner.

6. The method of claim 1, further comprising determining a vendor associated with the CPE based on the similarity score representing the similarity between the CPE and the banner.

7. At least one computer system that matches a common platform enumeration (CPE) to a web service, comprising:

at least one central processing unit; and at least one memory device storing instructions that, when executed by the at least one central processing unit, perform operations, the operations comprising:

generating banner token embeddings using a banner associated with the web service;

generating CPE token embeddings using the CPE;

generating a similarity score representing a similarity between the CPE and the banner based on the banner token embeddings and the CPE token embeddings; and predicting a match between the CPE and the web service based on the similarity score representing the similarity between the CPE and the banner.

8. The at least one computer system of claim 7, wherein the operations further comprise determining a true positive match between the CPE and the banner.

9. The at least one computer system of claim 7, wherein the operations further comprise determining a false positive match between the CPE and the banner.

10. The at least one computer system of claim 7, wherein the operations further comprise generating the similarity score using matrices representing the banner token embeddings and the CPE token embeddings.

11. The at least one computer system of claim 7, wherein the operations further comprise generating the similarity score using vectors representing the banner token embeddings and the CPE token embeddings.

12. The at least one computer system of claim 7, wherein the operations further comprise banner grabbing the banner associated with the web service.

13. The at least one computer system of claim 7, wherein the operations further comprise comparing the similarity score to a threshold value.

14. The at least one computer system of claim 13, wherein in response to the similarity score satisfying the threshold value, then the operations further comprise predicting a true positive match between the CPE and the web service.

15. The at least one computer system of claim 13, wherein in response to the similarity score failing to satisfy the threshold value, then the operations further comprise predicting a false positive match between the CPE and the web service.

16. The at least one computer system of claim 7, wherein the operations further comprise determining a product associated with the CPE based on the similarity score representing the similarity between the CPE and the banner.

17. The at least one computer system of claim 7, wherein the operations further comprise determining a vendor associated with the CPE based on the similarity score representing the similarity between the CPE and the banner.

18. A memory device storing instructions that, when executed by at least one central processing unit, perform operations that match a common platform enumeration (CPE) to a web service, the operations comprising:

generating banner token embeddings using a banner associated with the web service;

generating CPE token embeddings using the CPE;

generating a similarity score representing a similarity between the CPE and the banner using matrices that represent the banner token embeddings and the CPE token embeddings; and predicting a match between the CPE and the web service based on the similarity score representing the similarity between the CPE and the banner.

19. The memory device of claim 18, wherein the operations further comprise comparing the similarity score to a threshold value.

20. The memory device of claim 19, wherein in response to the similarity score satisfying the threshold value, then the operations further comprise predicting a true positive match between the CPE and the web service.

* * * * *